(12) United States Patent
Basu et al.

(10) Patent No.: US 11,894,543 B2
(45) Date of Patent: *Feb. 6, 2024

(54) SOLUTION-PHASE DEPOSITION OF THIN FILMS ON SOLID-STATE ELECTROLYTES

(71) Applicant: Coreshell Technologies, Inc., Berkeley, CA (US)

(72) Inventors: Sourav Roger Basu, Berkeley, CA (US); Jonathan Tan, Berkeley, CA (US)

(73) Assignee: CORESHELL TECHNOLOGIES, INCORPORATED, San Leandro, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/950,922

(22) Filed: Nov. 18, 2020

(65) Prior Publication Data

US 2021/0257604 A1 Aug. 19, 2021

Related U.S. Application Data

(63) Continuation-in-part of application No. 16/244,024, filed on Jan. 9, 2019, now Pat. No. 10,985,360, which
(Continued)

(51) Int. Cl.
*H01M 4/04* (2006.01)
*H01M 10/0562* (2010.01)
*H01M 10/058* (2010.01)

(52) U.S. Cl.
CPC ......... *H01M 4/049* (2013.01); *H01M 4/0407* (2013.01); *H01M 10/058* (2013.01);
(Continued)

(58) Field of Classification Search
CPC ............... H01M 4/049; H01M 4/0407; H01M 10/0562; H01M 10/058; H01M 2300/0071; H01M 2300/0082
(Continued)

(56) References Cited

U.S. PATENT DOCUMENTS

| | | |
|---|---|---|
| 5,108,552 A | 4/1992 | Desthomas |
| 5,516,704 A | 5/1996 | Yoshida |

(Continued)

FOREIGN PATENT DOCUMENTS

| | | |
|---|---|---|
| CN | 1761086 A | 4/2006 |
| CN | 102179333 A | 9/2011 |

(Continued)

OTHER PUBLICATIONS

"International Application Serial No. PCT US2020 019717, International Search Report dated Jul. 22, 2020", 4 pgs.
(Continued)

*Primary Examiner* — Brian K Talbot
(74) *Attorney, Agent, or Firm* — SCHWEGMAN LUNDBERG & WOESSNER, P.A.

(57) ABSTRACT

Methods, systems, and compositions for the solution-phase deposition of thin films comprising one or more artificial solid-electrolyte interphase (SEI) layers. The thin films can be coated onto the surface of porous components of electrochemical devices, such as solid-state electrolytes employed in rechargeable batteries. The methods and systems provided herein involve exposing the component to be coated to different liquid reagents in sequential processing steps, with optional intervening rinsing and drying steps. Processing may occur in a single reaction chamber or multiple reaction chambers.

27 Claims, 5 Drawing Sheets

Related U.S. Application Data is a continuation of application No. PCT/US2018/038612, filed on Jun. 20, 2018.

(60) Provisional application No. 62/936,609, filed on Nov. 18, 2019, provisional application No. 62/522,470, filed on Jun. 20, 2017.

(52) U.S. Cl.
CPC .............. *H01M 10/0562* (2013.01); *H01M 2300/0071* (2013.01); *H01M 2300/0082* (2013.01)

(58) Field of Classification Search
USPC .................................... 427/58, 115
See application file for complete search history.

(56) References Cited

U.S. PATENT DOCUMENTS

| | | | |
|---|---|---|---|
| 5,863,603 | A | 1/1999 | Sandhu et al. |
| 6,596,148 | B1 | 7/2003 | Belongia et al. |
| 7,521,097 | B2 | 4/2009 | Horne et al. |
| 8,192,789 | B2 | 6/2012 | Albano et al. |
| 10,033,041 | B2* | 7/2018 | Perng .................. H01M 4/525 |
| 10,062,922 | B2* | 8/2018 | Kumar ............ H01M 10/0569 |
| 10,243,197 | B2* | 3/2019 | Cho .................... H01M 4/382 |
| 10,290,864 | B2 | 5/2019 | Burshtain et al. |
| 10,497,927 | B2* | 12/2019 | Xiao .................... H01M 4/134 |
| 10,505,219 | B2* | 12/2019 | Singh .............. H01M 10/0568 |
| 10,923,726 | B2* | 2/2021 | Cho .................... H01M 4/382 |
| 10,985,360 | B2* | 4/2021 | Basu .................... H01M 4/62 |
| 11,139,460 | B2 | 10/2021 | Basu et al. |
| 11,223,036 | B2* | 1/2022 | Liu ...................... H01M 4/134 |
| 11,349,111 | B2* | 5/2022 | Singh ................ H01M 10/446 |
| 11,453,948 | B2* | 9/2022 | Gallant ................ H01M 4/134 |
| 11,588,142 | B2* | 2/2023 | Basu .................. H01M 4/0407 |
| 2001/0042686 | A1 | 11/2001 | Taniguchi et al. |
| 2005/0233156 | A1 | 10/2005 | Senzaki et al. |
| 2006/0263687 | A1 | 11/2006 | Leitner et al. |
| 2007/0026156 | A1 | 2/2007 | Mandai et al. |
| 2008/0145755 | A1 | 6/2008 | Iacovangelo et al. |
| 2009/0246908 | A1 | 10/2009 | Basol et al. |
| 2009/0297696 | A1 | 12/2009 | Pore et al. |
| 2010/0193365 | A1 | 8/2010 | Lopatin et al. |
| 2010/0330425 | A1 | 12/2010 | Lopatin et al. |
| 2011/0159365 | A1 | 6/2011 | Loveness et al. |
| 2011/0159377 | A1 | 6/2011 | Lee et al. |
| 2011/0311867 | A1 | 12/2011 | Wakizaka et al. |
| 2012/0034767 | A1 | 2/2012 | Xiao et al. |
| 2012/0104204 | A1 | 5/2012 | Hung |
| 2012/0295038 | A1 | 11/2012 | Ma et al. |
| 2013/0248773 | A1 | 9/2013 | Chang et al. |
| 2013/0285597 | A1 | 10/2013 | Goldstein |
| 2013/0330472 | A1 | 12/2013 | Honda et al. |
| 2014/0234715 | A1 | 8/2014 | Fasching et al. |
| 2015/0147471 | A1 | 5/2015 | Yamada |
| 2015/0148557 | A1 | 5/2015 | Lee et al. |
| 2015/0162602 | A1 | 6/2015 | Dadheech et al. |
| 2016/0020449 | A1 | 1/2016 | Hamers et al. |
| 2016/0090652 | A1 | 3/2016 | Clark |
| 2016/0126582 | A1 | 5/2016 | Xiao et al. |
| 2016/0254572 | A1 | 9/2016 | Yu et al. |
| 2016/0258079 | A1 | 9/2016 | Sweeney et al. |
| 2016/0294028 | A1* | 10/2016 | Ye ....................... H01M 4/624 |
| 2016/0351943 | A1 | 12/2016 | Albano et al. |
| 2016/0351973 | A1 | 12/2016 | Albano et al. |
| 2017/0047575 | A1 | 2/2017 | Tsuji et al. |
| 2017/0104204 | A1 | 4/2017 | Zhamu et al. |
| 2017/0170477 | A1 | 6/2017 | Sakshaug et al. |
| 2017/0352883 | A1 | 12/2017 | Cho et al. |
| 2018/0375089 | A1 | 12/2018 | Gonser et al. |
| 2019/0044151 | A1 | 2/2019 | Elam et al. |
| 2019/0393478 | A1 | 12/2019 | Basu et al. |
| 2020/0161635 | A1 | 5/2020 | Liu et al. |
| 2021/0242443 | A1 | 8/2021 | Basu et al. |
| 2022/0045307 | A1 | 2/2022 | Basu et al. |
| 2022/0320479 | A1 | 10/2022 | Basu et al. |

FOREIGN PATENT DOCUMENTS

| | | |
|---|---|---|
| CN | 102379050 A | 3/2012 |
| CN | 103930970 A | 7/2014 |
| CN | 111095627 | 5/2020 |
| CN | 115210916 A | 10/2022 |
| EP | 3642896 | 4/2020 |
| JP | H1079246 | 3/1998 |
| JP | 2011143388 A | 7/2011 |
| JP | 2012516941 | 7/2012 |
| JP | 2016521906 | 7/2016 |
| JP | 2020524890 A | 8/2020 |
| JP | 7200143 B2 | 12/2022 |
| KR | 20200020713 | 2/2020 |
| KR | 10-2501600 B1 | 2/2023 |
| WO | 2017093460 | 6/2017 |
| WO | 2018237083 | 12/2018 |
| WO | 2021101915 | 5/2021 |

OTHER PUBLICATIONS

"International Application Serial No. PCT US2020 019717, Written Opinion dated Jul. 22, 2020", 11 pgs.

"International Application Serial No. PCT US2020 021995, International Search Report dated May 15, 2020", 3 pgs.

"International Application Serial No. PCT US2020 021995, Written Opinion dated May 15, 2020", 11 pgs.

"U.S. Appl. No. 16/244,024, Notice of Allowance dated Mar. 10, 2021", 9 pgs.

"International Application Serial No. PCT US2018 038612, International Preliminary Report on Patentability dated Jan. 2, 2020", 12 pgs.

"International Application Serial No. PCT US2018 038612, International Search Report dated Nov. 5, 2018", 4 pgs.

"International Application Serial No. PCT US2018 038612, Written Opinion dated Nov. 5, 2018", 10 pgs.

"U.S. Appl. No. 16/244,024, Non Final Office Action dated Mar. 15, 2019", 11 pgs.

"U.S. Appl. No. 16/244,024, Non Final Office Action dated Dec. 17, 2019", 12 pgs.

"U.S. Appl. No. 16/244,024, Non Final Office Action dated Dec. 1, 2020", 15 pgs.

"U.S. Appl. No. 16/244,024, Response filed Jun. 15, 2019 to Non Final Office Action dated Mar. 15, 2019", 14 pgs.

"U.S. Appl. No. 16/244,024, Response filed Feb. 10, 2020 to Non Final Office Action dated Dec. 17, 2019", 13 pgs.

"U.S. Appl. No. 16/244,024, Response filed Feb. 13, 2021 to Non Final Office Action dated Dec. 1, 2020", 13 pgs.

"U.S. Appl. No. 16/244,024, Final Office Action dated Jul. 16, 2019", 13 pgs.

"U.S. Appl. No. 16/244,024, Final Office Action dated Apr. 7, 2020", 13 pgs.

"U.S. Appl. No. 16/244,024, Response filed Oct. 16, 2019 to Final Office Action dated Jul. 16, 2019", 13 pgs.

"U.S. Appl. No. 16/244,024, Response filed May 15, 2020 to Final Office Action dated Apr. 7, 2020", 13 pgs.

"U.S. Appl. No. 16/244,024, Examiner Interview Summary dated May 22, 2019", 3 pgs.

"U.S. Appl. No. 16/244,024, Examiner Interview Summary dated May 5, 2020", 3 pgs.

"U.S. Appl. No. 16/244,024, Examiner Interview Summary dated Jan. 27, 2021", 2 pgs.

"U.S. Appl. No. 16/244,024, Advisory Action dated Jun. 2, 2020", 3 pgs.

"U.S. Appl. No. 16/244,024, Response filed Jun. 7, 2020 to Advisory Action dated Jun. 2, 2020", 14 pgs.

"International Application Serial No. PCT US2020 059590, International Search Report dated Feb. 4, 2021", 3 pgs.

"International Application Serial No. PCT US2020 059590, Written Opinion dated Feb. 4, 2021", 8 pgs.

(56) References Cited

OTHER PUBLICATIONS

"European Application Serial No. 18820797.1, Extended European Search Report dated Feb. 25, 2021", 9 pgs.
"U.S. Appl. No. 17/232,945, Preliminary Amendment filed Apr. 30, 2021", 3 pgs.
"International Application Serial No. PCT US2020 060930, International Search Report dated Mar. 19, 2021", 4 pgs.
"International Application Serial No. PCT US2020 060930, Written Opinion dated Mar. 19, 2021", 4 pgs.
"International Application Serial No. PCT US2020 060930, Invitation to Pay Additional Fees dated Jan. 12, 2021", 2 pgs.
"U.S. Appl. No. 17/232,945, Non Final Office Action dated Jun. 11, 2021", 6 pages.
"U.S. Appl. No. 17/232,945, 17 232,945, Response filed Jun. 22, 2021 to Non Final Office Action dated Jun. 11, 2021", 9 pages.
"U.S. Appl. No. 17/232,945, Notice of Allowance dated Aug. 20, 2021", 8 pgs.
"U.S. Appl. No. 17/232,945, Notice of Allowability dated Aug. 27, 2021", 2 pgs.
Ban, Chunmei, "Molecular Layer Deposition for Surface Modification of Lithium-Ion Battery Electrodes", Adv. Mater. Interfaces 2016, 1600762, (2016), 1-12.
"Japanese Application Serial No. 2019-571472, Notification of Reasons for Refusal dated Oct. 26, 2021", with English translation, 7 pages.
"Korean Application Serial No. 10-2019-7037281, Notice of Preliminary Rejection dated Oct. 29, 2021", with English translation, 5 pages.
"Korean Application Serial No. 10-2019-7037281, Response Filed Dec. 29, 2021 to Notice of Preliminary Rejection dated Oct. 29, 2021", with English claims, 25 pgs.
"Japanese Application Serial No. 2019-571472, Response Filed Mar. 1, 2022 to Notification of Reasons for Refusal dated Oct. 26, 2021", with English claims, 14 pages.
"U.S. Appl. No. 17/848,749, Corrected Notice of Allowability dated Nov. 3, 2022", 3 pgs.
"U.S. Appl. No. 17/848,749, Non Final Office Action dated Aug. 24, 2022".
"U.S. Appl. No. 17/848,749, Notice of Allowance dated Oct. 24, 2022", 8 pgs.
"U.S. Appl. No. 17/848,749, Response filed Sep. 8, 2022 to Non Final Office Action dated Aug. 24, 2022", 8 pgs.
"International Application Serial No. PCT/US2020/060930, International Preliminary Report on Patentability dated Jun. 2, 2022", 9 pgs.
"Japanese Application Serial No. 2019-571472, Examiners Decision of Final Refusal dated May 10, 2022", w/ English translation, 4 pgs.
"Japanese Application Serial No. 2019-571472, Response Filed Sep. 6, 2022 to Examiners Decision of Final Refusal dated May 10, 2022", 15 pgs.
"Korean Application Serial No. 10-2019-7037281, Notice of Preliminary Rejection dated May 31, 2022", W/English Translation, 13 pgs.
"Korean Application Serial No. 10-2019-7037281, Response Filed Aug. 31, 2022 to Notice of Preliminary Rejection dated May 31, 2022", W/ English Claims, 21 pgs.
"U.S. Appl. No. 17/410,797, Non Final Office Action dated Mar. 22, 2023", 12 pgs.
"Chinese Application Serial No. 201880040441.0, Office Action dated Jan. 20, 2023", w/ English Translation, 67 pgs.
"Chinese Application Serial No. 201880040441.0, Response Filed Jun. 2, 2023 to Office Action dated Jan. 20, 2023", with English claims, 28 pages.
"European Application Serial No. 20891382.2, Response Filed Jan. 6, 2023 to Communication Pursuant to Rules 161(2) and 162 EPC", 19 pgs.
"U.S. Appl. No. 17/410,797, Response filed Jul. 21, 2023 to Non Final Office Action dated Mar. 22, 2023", 14 pgs.

\* cited by examiner

SOLUTION-PHASE DEPOSITION OF THIN FILMS ON SOLID-STATE ELECTROLYTES

CROSS-REFERENCE TO RELATED APPLICATIONS

This application claims the benefit of U.S. Provisional Application No. 62/936,609, filed on Nov. 18, 2019, and is a continuation-in-part application of U.S. application Ser. No. 16/244,024, filed on Jan. 9, 2019, and issued on Apr. 20, 2021, as U.S. Pat. No. 10,985,360, which is a continuation application of International Patent Application No. PCT/US2018/038612, filed on Jun. 20, 2018, which claims the benefit of U.S. Provisional Application No. 62/522,470, filed on Jun. 20, 2017, each of which is entirely incorporated by reference herein for all purposes.

FIELD

Embodiments of the present disclosure generally relate to methods and systems for the coating of thin films onto the surface of solid-state electrolytes employed in rechargeable batteries.

BACKGROUND

Solid ceramic, solid inorganic or solid polymer electrolytes, when employed as ion-transfer media in rechargeable batteries, provide a number of advantages over their liquid-phase counterparts. For example, substantially reduced (or eliminated) flammability of solid-state electrolytes provides greatly improved safety of resulting batteries relative to the state-of-the-art. Solid-state electrolytes typically display enhanced electrochemical stability as compared to liquid-phase electrolytes, thereby enabling batteries fabricated with solid-state electrolytes to be operated at wider voltage ranges.

However, solid-state electrolytes present a number of interfacial issues when used in conjunction with standard rechargeable battery electrodes. For example, when paired with Lithium-Ion battery electrodes, interfaces between the solid-electrolyte and adjacent electrodes typically add ionic impedance, thereby reducing battery power density. These interfaces can also inhibit adequate wetting between electrode and electrolyte, and can also result in the formation of undesirable secondary phases due to thermodynamic instability.

Therefore, a need exists to modify the electrode/electrolyte interface in rechargeable batteries fabricated with solid-electrolytes in such a way so as to mitigate these aforementioned issues.

Recent research has attempted to improve the solid-electrolyte/electrode interface through the application of thin-film coatings deposited by Atomic Layer Deposition (ALD). Coatings applied via ALD have demonstrated improvements in electrode material wetting, reduced impedance and reduced deleterious side reactions typically associated with capacity fade.

Traditional vapor-phase atomic layer deposition (ALD) techniques rely on the evaporation of metalorganic precursors in an evacuated chamber; substrates placed within this chamber are exposed to an impinging flux of metalorganic vapor. Substrate surfaces react with impinging vapor to produce precisely one self-limiting, surface-saturating monolayer of adsorbed metalorganic. In one instance, metalorganic adsorption, followed by purge of excess metalorganic using vacuum and inert gas, followed by exposure of substrate surface to an oxidizer (such as $H_2O$, $O_2$ or $O_3$) results in the formation of precisely one monolayer of metal oxide.

ALD is particularly well-suited for generating conformal coatings with precise thicknesses on substrates possessing a porous microstructure, such as a solid-electrolyte matrix. Substrates possessing this kind of morphology often cannot be adequately coated by other physical vapor deposition (PVD) processes (such as sputtering) because of "line-of-sight" limitations. To conformally and uniformly coat all surfaces within a porous morphology, a deposition technique akin to ALD is required, where substantial time is allowed for surface mobility of adsorbed atoms prior to reaction. However, numerous manufacturing limitations of traditional ALD processes present a need for a more manufacturable process that achieves similar film quality, uniformity and conformality.

While metalorganic reagents (i.e., precursors) used in ALD of oxides such as $Al_2O_3$ and ZnO (trimethylaluminum (TMA) and diethylzinc (DEZ), respectively) evaporate at relatively low temperatures (<100° C.) and at modest base vacuum pressures (>1 Torr), most metalorganic precursors require temperatures greater than 100° C. (and many greater than 200° C.) to yield a substantial vapor pressure. The key drawback to high precursor boiling point is that the substrate temperature must also be maintained above the precursor boiling point to prevent condensation of precursor on substrate surfaces. Precursor condensation results in loss of monolayer-by-monolayer growth control, which in turn results in unpredictable final film thickness. Substrates in an evacuated ALD chamber also often need to be heated radiatively (as with suspended roll-to-roll foil substrates), due to the lack of a heat transfer medium. Radiative heating is inefficient for reflective foil substrates such as those used in battery electrodes. Residual gases trapped within layers of roll-to-roll substrates can also lengthen pump down time in traditional ALD chambers, and the loss of unused precursor through continuous purge and evacuation result in poor materials utilization in traditional ALD processes. The pyrophoric nature of the gaseous metalorganic precursors typically used in traditional ALD processes also requires the incorporation of costly safety infrastructure.

For decades, high quality, conformal thin films of oxides and chalcogenides have been deposited on porous substrates by techniques other than ALD, such as chemical bath deposition (CBD), successive-ionic layer adsorption and reaction (SILAR) and layer-by-layer sol-gel. In the CBD technique, (typically) aqueous solutions of complexed metal precursors are mixed with chalcogenide or oxide ion sources. Temperatures for these processes are usually modest, well below decomposition temperatures for battery electrode materials, binders or separators. CBD is best known for depositing high quality CdS or ZnS as the n-type junction partner on CdTe or CIGS thin film solar cells. This technique has been used for years to set world record efficiencies for these types of solar cells. They have yielded high open-circuit voltages, high diode ideality and high shunt resistance, indicating excellent film quality and conformality. CBD processes have also been commercialized into high-volume thin film solar cell production lines.

A useful variation of the CBD technique is SILAR. In this instance, substrates are alternately exposed to cationic and anionic reactant solutions, with rinse steps in between. While this technique results in slower film growth, a benefit of the technique is the elimination of homogenous nucleation (precipitation) from intermixing of the two reactants, which dramatically improves materials utilization. Considering the fact that the tunneling limit of a good dielectric is on the order of 1-2 nm, SILAR techniques are feasible for deposition of passivation layers on solid electrolyte surfaces. Thickness control in SILAR processes is also better than in CBD processes; thickness control of a passivation layer on solid electrolytes, for instance, is critical to prevent unwanted barriers to lithium diffusion while maintaining an electron tunneling barrier.

Solution-based techniques also exist that demonstrate layer by layer sol-gel coating using the same kinds of metalorganics used in vapor phase ALD. For instance, an $Al_2O_3$ monolayer can be grown by immersion of a substrate in a solution of an appropriate aluminum alkoxide. The adsorption of the metalorganic precursor, followed by an oxidizing step such as hydrolysis, can yield one monolayer of oxide. These steps are repeated with rinse steps in between to yield monolayer-by-monolayer coatings. The metal alkoxide precursors are typically soluble to very high molarities in standard organic solvents like 2-propanol. In recent years, high quality $Al_2O_3$, $SiO_2$ and $ZrO_2$ recombination blocking layers were all grown on $TiO_2$ dye-sensitized solar cells using this technique. Similar techniques have also been employed to deposit various polymer materials, such as "metalcones" and polyamides.

U.S. PGPUB 2016/0090652 presents a liquid phase ALD method akin to that described above, wherein discrete wafer substrates are consecutively exposed to a solution of metalorganic precursor, a rinse solvent to remove excess metalorganic, an oxidizing solution and another rinse. These four steps are repeated to yield any desired thickness of film. The wafer is attached to a spin-coating apparatus; immediately after each step the wafer is spun to remove excess fluid. While this technique may work well for substrates similar to wafers, the process cannot be used to coat continuous substrates such as rolls of foil. Additionally, spin-coating systems can only coat individual discrete substrates up to a few hundred mm in lateral dimension. Larger substrates are also impractical to coat via spin-coating due to practical mechanical limitations. Uniformity of coating also degrades with increasing substrate dimensions.

Hence, there is also a need for the economical coating of porous, discrete substrates. While traditional ALD techniques have been demonstrated at scale for the coating of certain discrete substrates such as wafers, they often suffer from the same manufacturability limitations as continuous substrates, as described above. This becomes especially true when the coating material of interest requires a precursor that is costly, and poor materials utilization in ALD makes the process economically unviable.

In this context, an example of a discrete porous substrate that could be more economically coated by a solution-phase deposition technique is a free-standing solid-state electrolyte, such as a ceramic solid-state electrolyte. An example of a ceramic solid-state electrolyte that is often processed as free-standing, discrete, sintered pellets or plates is $Li_7La_3Zr_2O_{12}$ (LLZO). Anode and cathode materials are then typically applied to either side of the free-standing electrolyte to yield a solid-state battery.

However, in order to meet demand for large-scale applications (such as consumer electronics, electric vehicles or grid-scale energy storage), rechargeable battery manufacturing has been typically scaled to take the form of a "roll-to-roll" (R2R) process, wherein large rolls of foil current collector are processed through various fabrication steps in a high-speed, continuous manner, ultimately yielding rolls of battery electrode that are then slit and sectioned into individual cells. This manner of fabrication has resulted in numerous GWh of global Lithium-Ion battery production per year. Therefore, in order to scale solid-state batteries to meet the demand of the aforementioned large-scale applications without disrupting the (mature) R2R battery manufacturing process, solid-state electrolytes should also be applied using R2R fabrication techniques. One example is the co-sintering of solid ceramic electrolytes with standard Lithium-Ion cathode materials (such as $LiNi_xMn_yCo_zO_2$), which yields a bulk powder that may then be cast onto current collectors with the aid of standard adhesive and conductive binders. In another example, a solid-polymer electrolyte may be fabricated as a free-standing film and then "sandwiched" in-between sheets of anode and cathode prior to assembly as a cell, all as part of an in-line R2R process.

Unfortunately, the introduction of a R2R vapor-phase ALD processes within the Lithium-Ion manufacturing process with the purpose of applying coatings to solid-electrolytes or solid-electrolyte-electrode composite materials is untenable due to the numerous aforementioned process constraints in addition to high upfront capital costs and slow process times.

Accordingly, the present disclosure aims to meet the aforementioned needs by applying coatings to solid-electrolyte/electrode interfaces and provide other benefits, such as using a more low-cost, more scalable manufacturing process than ALD in a manner that can also be scaled to a R2R format.

SUMMARY

The systems and methods of the present disclosure provide methods for the solution-phase deposition of thin film coatings in the form of artificial solid-electrolyte interphase (SEI) layers on the surface of substrates, such as battery electrodes, solid-state electrolytes or solid-state electrolyte/electrode composite materials. The methods disclosed herein can enable batteries possessing solid-state electrolytes, and are more commercially and technically feasible for introduction into high-volume lithium-ion battery (LIB) manufacturing than roll-to-roll or discrete vapor-phase ALD or other high-vacuum, vapor deposition processes.

Particularly, in certain aspects, a liquid phase deposition method is provided for coating a thin film comprising an artificial SEI onto a substrate and a system for carrying out such a method. In some embodiments, the substrate is a continuous substrate that possesses an aspect ratio of at least 10:1 between its two largest dimensions, and is sufficiently flexible so as to be wound onto itself in the form of a roll. In some embodiments, the substrate is a discrete substrate that possesses an aspect ratio of <10:1 between its two largest dimensions and/or has a length dimension of at least 100 mm, and is sufficiently rigid so as to require handling as a discrete unit.

The methods and systems of the present disclosure promote precise control of thickness and conformality of desired artificial SEI films by allowing reagents (i.e., precursors) to adsorb and move across substrate surfaces as in ALD, albeit through a liquid-phase delivery instead of vapor-phase. The liquid-phase delivery of reagents disclosed herein takes advantage of the energy of solvation to mobilize reagents instead of relying on high-temperature thermal evaporation of current production methods. Another advantage of the present disclosure is that the solvents used vary in specific heat capacity and can also be employed as both heat transfer and precursor transfer media—yielding faster, more efficient heating of substrates. Precursors dissolved into solution are also much more stable with regards to air ambient exposure as compared to their pure analogs, yielding improved safety and easier handling.

Accordingly, in a basic embodiment, the present disclosure provides a method for coating a thin film comprising an artificial SEI onto a continuous substrate, the method comprising:
  (a) exposing the continuous substrate to a first liquid solution comprising at least a first reagent in a first reaction chamber to produce a layer comprising an absorbed first reagent on the continuous substrate and rinsing excess first reagent from substrate surface, followed by
  (b) exposing the continuous substrate from step (a) to a second liquid solution comprising at least a second reagent in a second reaction chamber, wherein the second reagent reacts with the first absorbed reagent to produce a monolayer of thin film comprising the artificial SEI coated onto the continuous substrate, the artificial SEI comprising a compound generated from the reaction of the second reagent and the absorbed first reagent, followed by rinsing excess second reagent from substrate surface The continuous substrate is typically used in electrochemical devices, such as a battery, and, in some embodiments, is composed of a flexible foil current collector that is coated with a composite matrix of solid electrolyte and electrode materials. In some embodiments, the continuous substrate is composed of a flexible foil current collector coated with electrode materials (i.e., without electrolyte). In other embodiments, the continuous substrate may be a continuous film of a solid-polymer-electrolyte. In some embodiments, the foil current collector comprises a metal. In some embodiments, the metal is Cu, Al or stainless steel.

In some embodiments, the electrode material comprises one or more of the following: graphite, Si, Sn, Ge, Al, P, Zn, Ga, As, Cd, In, Sb, Pb, Bi, SiO, $SnO_2$, Si, Sn, lithium metal, $LiNi_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_2O_5$, sulfur or $LiCoO_2$ where x, y and z are stoichiometric coefficients.

In some embodiments, the free-standing solid electrolyte or the solid electrolyte within the composite matrix of solid electrolyte and electrode material comprises one of the following: $Li_wLa_xM_yO_{12}$ (where M is Nb, Ta, or Zr), $Li_xMP_yS_z$ (where M is Ge or Sn), $Li_wAl_xM_y(PO_4)_3$ (where M is Ge or Ti), $Li_xTi_yM_z(PO_4)_3$ (where M is Al, Cr, Ga, Fe, Sc, In, Lu, Y or La) or $Na_xZr_2Si_yPO_{12}$, where in all cases, x, y and z represent stoichiometric coefficients. In some embodiments, the solid-state electrolyte is processed as free-standing, discrete, sintered pellets or plates. In some embodiments, the solid-state electrolyte is $Li_7La_3Zr_2O_{12}$ (LLZO).

In certain embodiments, the electrode material is composed of an active material, which is the portion of the electrode that inserts/de-inserts lithium during charging/discharging, respectively, and other constituent materials such as an adhesive binder and an electrically conductive additive.

In certain embodiments, the continuous substrate is a solid-polymer film composed of one or more of the following polymers: polyethylene oxide (PEO), poly vinyl alcohol (PVA), poly methyl methacrylate (PMMA), poly dimethyl siloxane (PDMS), poly vinyl pyrollidone (PVP). Such polymers, when combined with lithium salts such as $LiClO_4$, $LiPF_6$ or $LiNO_3$, among others, can yield a solid polymer electrolyte thin film.

In some embodiments, the thin film comprising an artificial SEI is coated onto a rigid, discrete substrate by a method comprising:
  (a) exposing the discrete substrate to a first liquid solution comprising at least a first reagent in a first reaction chamber to produce a layer comprising an absorbed first reagent on the continuous substrate, followed by rinsing of excess first reagent from the substrate surface and
  (b) exposing the discrete substrate from step (a) to a second liquid solution comprising at least a second reagent in a second reaction chamber, wherein the second reagent reacts with the first absorbed reagent to produce a monolayer of thin film comprising the artificial SEI coated onto the continuous substrate, the artificial SEI comprising a compound generated from the reaction of the second reagent and the absorbed first reagent, followed by rinsing excess second reagent from substrate surface In some embodiments, the discrete substrate is a free-standing sintered pellet or plate of a solid electrolyte, comprising one of the following materials: $Li_wLa_xM_yO_{12}$ (where M is Nb, Ta, or Zr), $Li_xMP_yS_z$ (where M is Ge or Sn), $Li_wAl_xM_y(PO_4)_3$ (where M is Ge or Ti), $Li_xTi_yM_z(PO_4)_3$ (where M is Al, Cr, Ga, Fe, Sc, In, Lu, Y or La) or $Na_xZr_2Si_yPO_{12}$, where in all cases, x, y and z represent stoichiometric coefficients.

In certain embodiments, the conveyance apparatus may be a roll-to-roll deposition system. In some embodiments, the conveyance apparatus comprises a series of rollers for guiding the substrate to the deposition chamber. In some embodiments, the conveyance apparatus comprises a track, by which a discrete substrate is conveyed from one deposition chamber to the next.

In certain embodiments, the method further comprises exposing the coated continuous or discrete substrate to a thermal treatment in the presence of an ambient comprising a defined composition of gases. In some embodiments these gases may be a mixture of $O_2$, ozone, $N_2$, Ar. In some embodiments the coated substrate may be heated to temperatures up to 1000 degrees Celsius within the presence of gases. In some embodiments the coated substrate may be heated while being exposed to a plasma comprising oxygen, argon, hydrogen or nitrogen.

The first liquid solution comprises at least a first reagent. The first reagent may be any compound that is able to react with the material of the continuous substrate to form a self-limiting layer on the continuous substrate. In certain embodiments, the first reagent is a metalorganic compound. Examples of such metalorganics include, but are not limited to, aluminum tri-sec butoxide, titanium ethoxide, niobium ethoxide, trimethyl aluminum, and zirconium tert-butoxide. In another embodiment, the first reagent comprises an aqueous solution comprising an ionic compound. Examples include, but are not limited to, zinc acetate, cadmium chloride, zinc chloride, zirconium chloride, and zinc sulfate. In some embodiments the first solution may vary in pH.

In the embodiments where the first reagent is a metalorganic, the first liquid solution may also comprise a solvent that is used to dissolve or complex the first reagent. Preferred solvents include organic solvents, such as an alcohol, for example, isopropyl alcohol or ethanol, alcohol derivates such as 2-methoxyethanol, slightly less polar organic solvents such as pyridine or tetrahydrofuran (THF), or nonpolar organic solvents such as hexane and toluene.

The first liquid solution is contained within a first reaction chamber. The reaction chamber may be any device suitable for carrying out step (a). Thus, the reaction chamber must be large enough to receive the continuous substrate and able to contain the amount of liquid solution to be used. Such devices that may be used as the reaction chamber include, but are not limited to, tanks, baths, trays, beakers, or the like.

After adsorption of the first layer on the continuous substrate in step (a), it is common that unreacted reagent and excess solvent remain present on the substrate. To remove these compounds, the continuous substrate may undergo an optional rinsing or purging step. In this step, the substrate is rinsed with a first rinsing solution comprising a solvent that removes the unwanted and unreacted compounds from the continuous substrate. The rinsing step leaves exactly one saturated (i.e. purified) first layer on the substrate that may be directed to step (b) of the process and a residual solution comprising the first solvent and the unreacted first reagent in the reaction chamber.

As an additional optional step, to recover the solvent used in the rinsing step and any unreacted reagent, the residual solution may be passed to a filtration step. The filtration step separates the solvent from the unreacted reagent (and any reaction byproduct). The filtration step also prevents cross-contamination between chambers and avoids slow contamination of rinse solutions with reagent over the course of operation. Continuous filtering of rinse baths can not only maintain purity of rinse solvent but can also act as a system for materials recovery, thereby boosting the materials utilization efficiency of the process. Any filtration techniques known in the art may be used. Preferred technologies include, but are not limited to, membrane separation, chemical precipitation, ion-exchange, electrochemical removal, physical adsorption, and flow filtration chromatography.

The separated solvent may be recycled back to the rinsing step for reuse. Likewise, the filtered unreacted first reagent may also be recycled back to step (a) for further use in the process.

The resulting continuous substrate having a layer comprising an adsorbed first reagent is then sent to step (b). Here, the continuous substrate is exposed to a second liquid solution comprising a second reagent in a second reaction chamber in a similar way as described above for step (a). In some embodiments, the second liquid solution will comprise an oxidizing agent, such as an oxide or chalcogenide source, examples of which include, but are not limited to, water, thiourea, and sodium sulfide. A solvent may also be present, which may comprise of polar or nonpolar organic solvents or may just be water. In other embodiments, the second liquid solution may also contain a nitrogen-containing reagent such as ammonia or hydrazine. In some embodiments the second solution may also vary in pH.

The second reagent is selected to be able to react with the adsorbed first reagent to produce a complete monolayer of artificial SEI compound coated onto the substrate. A non-limiting list of the compound formed includes:
  (a) binary oxides of type $A_xO_y$, where A is an alkali metal, alkali-earth metal, transition metal, semimetal or metalloid and x and y are stoichiometric coefficients;
  (b) ternary oxides of type $A_xB_yO_z$, where A and B are any combination of alkali metal, alkali-earth metal, transition metal, semimetal or metalloid and x, y and z are stoichiometric coefficients;
  (c) quaternary oxides of type $A_wB_xC_yO_z$, where A, B and C are any combination of alkali metal, alkali-earth metal, transition metal, semimetal or metalloid and w, x, y and z are stoichiometric coefficients;
  (d) binary halides of type $A_xB_y$, where A is an alkali metal, alkali-earth metal, transition metal, semimetal or metalloid, B is a halogen and x and y are stoichiometric coefficients;
  (e) ternary halides of type $A_xB_yC_z$, where A and B are any combination of alkali metal, alkali-earth metal, transition metal, semimetal or metalloid, C is a halogen and x, y and z are stoichiometric coefficients;
  (f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;
  (g) binary nitrides of type $A_xN_y$, where A is an alkali metal, alkali-earth metal, transition metal, semimetal or metalloid and x and y are stoichiometric coefficients;
  (h) ternary nitrides of type $A_xB_yN_z$, where A and B are any combination of alkali metal, alkali-earth metal, transition metal, semimetal or metalloid and x, y and z are stoichiometric coefficients;
  (i) quaternary nitrides of type $A_wB_xC_yN_z$, where A, B and C are any combination of alkali metal, alkali-earth metal, transition metal, semimetal or metalloid and w, x, y and z are stoichiometric coefficients;
  (j) binary chalcogenides of type $A_xB_y$, where A is an alkali metal, alkali-earth metal, transition metal, semimetal or metalloid, B is a chalcogen and x and y are stoichiometric coefficients;
  (k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;
  (l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;
  (m) binary carbides of type $A_xC_y$, where A is an alkali metal, alkali-earth metal, transition metal, semimetal or metalloid and x and y are stoichiometric coefficients;
  (n) binary oxyhalides of type $A_xB_yO_z$, where A is an alkali metal, alkali-earth metal, transition metal, semimetal or metalloid, B is a halogen and x, y and z are stoichiometric coefficients;
  (o) binary arsenides of type $A_xAs_y$, where A is an alkali metal, alkali-earth metal, transition metal, semimetal or metalloid and x and y are stoichiometric coefficients;
  (p) ternary arsenides of type $A_xB_yAs_z$, where A and B are any combination of alkali metal, alkali-earth metal, transition metal, semimetal or metalloid and x, y and z are stoichiometric coefficients;
  (q) quaternary arsenides of type $A_wB_xC_yAs_z$, where A, B and C are any combination of alkali metal, alkali-earth metal, transition metal, semimetal or metalloid and w, x, y and z are stoichiometric coefficients;
  (r) binary phosphates of type $A_x(PO_4)_y$, where A is an alkali metal, alkali-earth metal, transition metal, semimetal or metalloid and x and y are stoichiometric coefficients;
  (s) ternary phosphates of type $A_xB_y(PO_4)_z$, where A and B are any combination of alkali metal, alkali-earth metal, transition metal, semimetal or metalloid and x, y and z are stoichiometric coefficients; and
  (t) quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

In the case that the reaction is between a non-ionic precursor such as a metalorganic with an oxidizer, as in the hydrolysis of trimethylaluminum, organic moieties are removed and replaced with metal-oxygen-metal bonds, until all bonds are fully saturated. In the case that the reaction is between two ionic solutions, as in the reaction between solutions of $Cd^{2+}$ and $S^{2-}$ ions, the high solubility product constant of the reaction promotes precipitation of an ionic compound, in this case CdS, with the substrate promoting heterogeneous film formation by minimizing surface energy.

As discussed above for step (a), the continuous substrate coated with a thin film comprising the artificial SEI from step (b) may undergo optional rinsing and filtration steps.

Steps (a) and (b) may be repeated in order to form a thin film comprising the artificial SEI of a desired thickness. In some embodiments, the thin film has a thickness of about 0.5 nm to 100 µm.

In other embodiments, a system for carrying out the liquid phase deposition methods as described above is provided. The system comprises a conveyance apparatus for conveying the continuous substrate from the first reaction chamber to the second reaction chamber. Accordingly, a system is provided that comprises a conveyance apparatus for conveying a continuous substrate to:
 (a) a first reaction chamber where the continuous substrate is exposed to a first liquid solution comprising at least a first reagent to produce a layer comprising an adsorbed first reagent on the continuous substrate; and
 (b) a second reaction chamber where the continuous substrate having a layer comprising an adsorbed first reagent is exposed to a second liquid solution comprising at least a second reagent, wherein the at least second reagent reacts with the first adsorbed reagent to produce the thin film comprising the artificial SEI coated onto the continuous substrate.

The conveyance apparatus, which is may be automated, comprises a series of rollers, such as tensioning rollers, positioned in such a manner as to guide or direct the continuous substrate into and out of the first and second reaction chambers. In this way, the system can provide for a continuous liquid deposition process for coating a thin film comprising an artificial SEI onto the surface of a continuous substrate. The series of rollers are driven by a conveying motor.

In certain embodiments, the first and second reaction chambers may include a sensor for determining or measuring the amount of first or second liquid solution that is in the respective reaction chamber or the concentration of precursor in each respective reaction chamber. Additionally, the first and second reaction chambers may also comprise a regulating valve that is electronically actuated by the sensor. When the sensor (such as a float switch) determines that the liquid solution is too low, the valve opens up, allowing more liquid solution from another source to flow into the reaction chamber. When the sensor determines that the liquid solution is at the desired level, the valve closes, preventing excess liquid solution from flowing into the reaction chamber. In some cases, if the sensor determines that the liquid solution is too high in the reaction chamber, the valve opens up, allowing the excess liquid to flow out of the reaction chamber. In the case that the sensor detects precursor concentration, a valve may expose the tank to a stock solution of high precursor concentration in the circumstance that the tank precursor solution is detected to be low, and vice-versa. An example of such a sensor is an ion-selective electrode.

In further embodiments, the system comprises a first rinsing chamber located between the first and second reaction chambers. The first rinsing chamber contains the first rinsing solution comprising the first solvent for rinsing the continuous substrate conveyed to the first rinsing chamber by the conveyance apparatus to produce a saturated first layer on the continuous substrate and a first residual solution comprising the first solvent and unreacted first reagent.

Likewise, the system may also comprise a second rinsing chamber located after the second reaction chamber. The second rinsing chamber contains a second rinsing solution comprising a second solvent for rinsing the continuous substrate conveyed to the second rinsing chamber by the conveyance apparatus to produce a thin film comprising an artificial SEI coated onto the continuous substrate.

Similar to the method described above, in yet a further embodiment, the system may also comprise a filtration apparatus for separating unreacted reagent from the solvent in the first and second rinsing solutions. The filtration apparatus may be any device that can perform such a separation. Preferably, the filtration apparatus is selected from one of the following: a membrane, a filtration column, or a chromatographic column, a chemical or electrochemical separation tank, or an adsorption column.

While certain embodiments presented above relate to methods and systems using liquid-phase deposition to coat a thin film comprising an artificial SEI onto a continuous substrate, other embodiments of the present disclosure are applicable to discrete substrates. Accordingly, in certain embodiments, a method is provided for coating a thin film comprising an artificial SEI layer onto a surface of a discrete substrate, the method comprising:
 (a) conveying discrete substrate into a first reaction chamber comprising at least a first liquid solution comprising a first reagent;
 (b) exposing the discrete substrate from step (a) to the first liquid solution to produce a layer comprising an adsorbed first reagent on the surface of the discrete substrate;
 (c) conveying the discrete substrate from step (b) to a second reaction chamber comprising a second liquid solution comprising at least a second reagent; and
 (d) exposing discrete substrate from step (c) to the second liquid solution, wherein the at least second reagent reacts with the first adsorbed reagent to produce the thin film comprising the artificial SEI coated onto the surface of the continuous substrate, the artificial SEI comprising a compound generated from the reaction of the second reagent and the absorbed first reagent.

In some embodiments, the discrete substrate is a free-standing sintered pellet or plate of a solid electrolyte, comprising one of the following materials: $Li_wLa_xM_yO_{12}$ (where M is Nb, Ta, or Zr), $Li_xMP_yS_z$ (where M is Ge or Sn), $Li_wAl_xM_y(PO_4)_3$ (where M is Ge or Ti), $Li_xTi_yM_z(PO_4)_3$ (where M is Al, Cr, Ga, Fe, Sc, In, Lu, Y or La) or $Na_xZr_2Si_yPO_{12}$, where in all cases, x, y and z represent stoichiometric coefficients.

Steps (a) and (b) are carried out by conveying the discrete substrate to the first and second reaction chambers by a conveying apparatus. Thus, in another embodiment, the present disclosure provides a system for coating a thin film comprising an artificial SEI onto the surface of a discrete substrate, comprising:
 a conveyance apparatus for conveying the discrete substrate to:
  (a) a first reaction chamber where the discrete substrate is exposed to a first liquid solution comprising at least a first reagent to produce a layer comprising an adsorbed first reagent on the surface of the discrete substrate; and (b) a second reaction chamber where the discrete substrate having a layer comprising an adsorbed first reagent is exposed to a second liquid solution comprising at least a second reagent, wherein the at least second reagent reacts with the first adsorbed reagent to produce a monolayer of thin film comprising the artificial SEI coated onto the surface of the discrete substrate.

The conveying apparatus used in the aforementioned embodiment is modified as compared to the conveying apparatus described for the continuous substrate to accommodate processing of the discrete substrate. In this embodiment, the conveying apparatus is a track-based conveyancing apparatus comprising:

(a) a horizontal track located above the first and second reaction chambers and spanning the length of the first and second reaction chambers; and (b) a vertical track attached to the horizontal track, the vertical track comprising an arm member driven by an arm motor that is configured to extend and retract in a substantially vertical direction and able to move along the horizontal track in a substantially horizontal direction, wherein the discrete substrate is connected to the vertical track, thereby allowing the discrete substrate to be conveyed to the first and second reaction chambers.

Again, steps (a) and (b) may be repeated in order to form a thin film comprising an artificial SEI of a desired thickness. In some embodiments, the thin film has a thickness of about 0.5 nm to 100 μm.

As discussed above for the continuous substrate, the discrete substrate may undergo optional rinsing and filtration steps.

In an alternative embodiment, rather than the continuous or discrete substrate being exposed to different reaction chambers by a conveyance apparatus as discussed above, the continuous or discrete substrate may be placed by a conveyance apparatus or otherwise in a single reaction chamber where it is sequentially exposed to different liquid reaction solutions. For example, a first liquid solution comprising a first reagent is introduced into the reaction chamber along with the substrate where a first reagent reacts with the substrate for a certain residence time to produce a layer comprising an adsorbed first reagent on the surface of the substrate. The first liquid solution is then completely removed, such as by draining, from the reaction chamber, as in a plug-flow reactor. Next, a second liquid solution comprising a second reagent is introduced into the reaction chamber where the second reagent reacts with the first adsorbed reagent to produce a monolayer of thin film comprising an artificial SEI coated onto the surface of the substrate. The second liquid solution and the substrate are then removed from the reaction chamber.

In an alternative embodiment, rather than sequentially expose substrates to different reaction solutions, multiple reaction solutions or reagents may be introduced into a reaction chamber containing the substrate at the same time. Under these circumstance, the differing reaction solutions or reagents, upon mixing, react and precipitate a thin film comprising an artificial SEI onto the surface of substrates submerged in the mixture of reaction solutions or reagents.

In certain aspects, the present disclosure provides for a method for depositing a thin film comprising an artificial SEI onto the surface of a discrete substrate, the method comprising: providing the discrete substrate onto a conveyance apparatus; transferring, by the conveyance apparatus, the discrete substrate to a first reaction chamber containing a first liquid solution comprising at least a first reagent; exposing, by the conveyance apparatus, the discrete substrate to the first liquid solution in the first reaction chamber to yield a layer partially coated with the at least first reagent chemically bonded onto the surface of the substrate; rinsing, in the first reaction chamber, the layer with a first rinsing solution comprising a first solvent to remove unreacted first reagent; transferring, by the conveyance apparatus, the substrate from (d) to a second reaction chamber containing a second liquid solution comprising at least a second reagent; exposing, by the conveyance apparatus, the discrete substrate to the second liquid solution in the second reaction chamber, wherein the at least second reagent reacts with the at least first reagent chemically bonded onto the surface of the discrete substrate to produce the artificial SEI coating comprising a monolayer on the surface of the discrete substrate, the monolayer comprising a compound generated from the reaction of the at least second reagent and the first reagent; and rinsing, in the second reaction chamber, the coating with a second rinsing solution comprising a second solvent to remove unreacted second reagent.

In certain aspects, the present disclosure provides a method for depositing an artificial solid electrolyte interphase (SEI) onto the surface of a solid-state electrolyte or a solid-state-electrolyte-electrode composite matrix (a "substrate"), the method comprising: providing the substrate onto a conveyance apparatus; transferring, by the conveyance apparatus, the substrate to a first reaction chamber containing a first liquid solution comprising at least a first reagent; exposing, by the conveyance apparatus, the substrate to the first liquid solution in the first reaction chamber to yield a partially coated layer of the artificial SEI with the at least first reagent chemically bonded onto the surface of the substrate; rinsing, in the first reaction chamber, the layer with a first rinsing solution comprising a first solvent to remove unreacted first reagent; transferring, by the conveyance apparatus, the substrate from (d) to a second reaction chamber containing a second liquid solution comprising at least a second reagent; exposing, by the conveyance apparatus, the substrate to the second liquid solution in the second reaction chamber, wherein the at least second reagent reacts with the at least first reagent chemically bonded onto the surface of the substrate to produce the artificial SEI coating comprising a monolayer on the surface of the substrate, the monolayer comprising a compound generated from the reaction of the at least second reagent and the first reagent; and rinsing, in the second reaction chamber, the coating with a second rinsing solution comprising a second solvent to remove unreacted second reagent.

In certain aspects, the present disclosure provides for a liquid phase deposition method for generating an artificial solid-electrolyte interphase (SEI) on surfaces of active materials within a porous, pre-formed lithium-ion battery electrode (such as a cathode or an anode), the method comprising providing the porous, pre-formed lithium-ion battery electrode comprising the active material onto a conveyance apparatus; transferring, by the conveyance apparatus, the porous, pre-formed lithium-ion battery electrode to a first reaction chamber containing a first liquid solution comprising at least a first reagent; exposing, by the conveyance apparatus, the porous, pre-formed lithium-ion battery electrode to the first liquid solution in the first reaction chamber to yield a partially-coated layer of the artificial SEI with the at least first reagent chemically bonded onto active material surfaces within the porous, pre-formed lithium-ion battery electrode; rinsing, in the first reaction chamber, the partially-coated layer of the artificial SEI with a first rinsing solution comprising a first solvent to remove any unreacted first reagent; transferring, by the conveyance apparatus, the porous, pre-formed lithium-ion battery electrode from (d) to a second reaction chamber containing a second liquid solution comprising at least a second reagent; exposing, by the conveyance apparatus, the porous, pre-formed lithium-ion battery electrode to the second liquid solution in the second reaction chamber, wherein the at least second reagent reacts with the at least first reagent chemically bonded onto the surface of the active materials to produce the artificial SEI comprising a monolayer on active material surfaces within the porous, pre-formed electrode, wherein the artificial SEI does not contribute to inter-particle resistance, and wherein the monolayer comprises a compound generated from the reaction of the first reagent and the at least second reagent and the first reagent; and rinsing, in the second reaction chamber, the artificial SEI with a second rinsing solution comprising a second solvent to remove any unreacted second reagent.

In certain aspects, the present disclosure provides for a battery cell, comprising an anode; a cathode; a solid-state electrolyte or a solid-state-electrolyte-electrode composite matrix disposed between the anode and the cathode, wherein the solid-state electrolyte or the solid-state-electrolyte-electrode composite matrix comprises an artificial solid-electrolyte interphase (SEI) layer produced by a liquid-phase deposition method as described herein; and a casing containing the anode, the cathode, the electrolyte, and the polymer separator, wherein the casing provides electrical contact to the anode and the cathode. In certain aspects, the present disclosure provides for a battery cell, comprising an anode; a cathode; a solid-state electrolyte or a solid-state-electrolyte-electrode composite matrix disposed between the anode and the cathode; and a casing containing the anode, the cathode, the electrolyte, and the polymer separator, wherein the casing provides electrical contact to the anode and the cathode, wherein at least one of the anode or cathode comprises an artificial solid-electrolyte interphase (SEI) layer produced by a liquid-phase deposition method as described herein. In certain embodiments, the battery cell further comprises a separator located between the anode and cathode.

DETAILED DESCRIPTION

Provided herein are methods, systems, and compositions for the solution-phase deposition of thin films comprising one or more artificial solid-electrolyte interphase (SEI) layers on the surface of substrates. To date, techniques for forming conformal coatings of thin films (<10 micrometer ($\mu$m) thickness) on substrates with a microstructure comprising a high degree of porosity, tortuosity and/or large number of high aspect ratio features (i.e., "non-planar" microstructure) are either ineffective ("line of sight" limitation of physical vapor deposition) or are costly and time-consuming, such as for traditional Atomic Layer Deposition (ALD). The methods of the present disclosure achieve a cost-effective means for forming uniform, conformal layers on non-planar microstructures.

Figure 5:
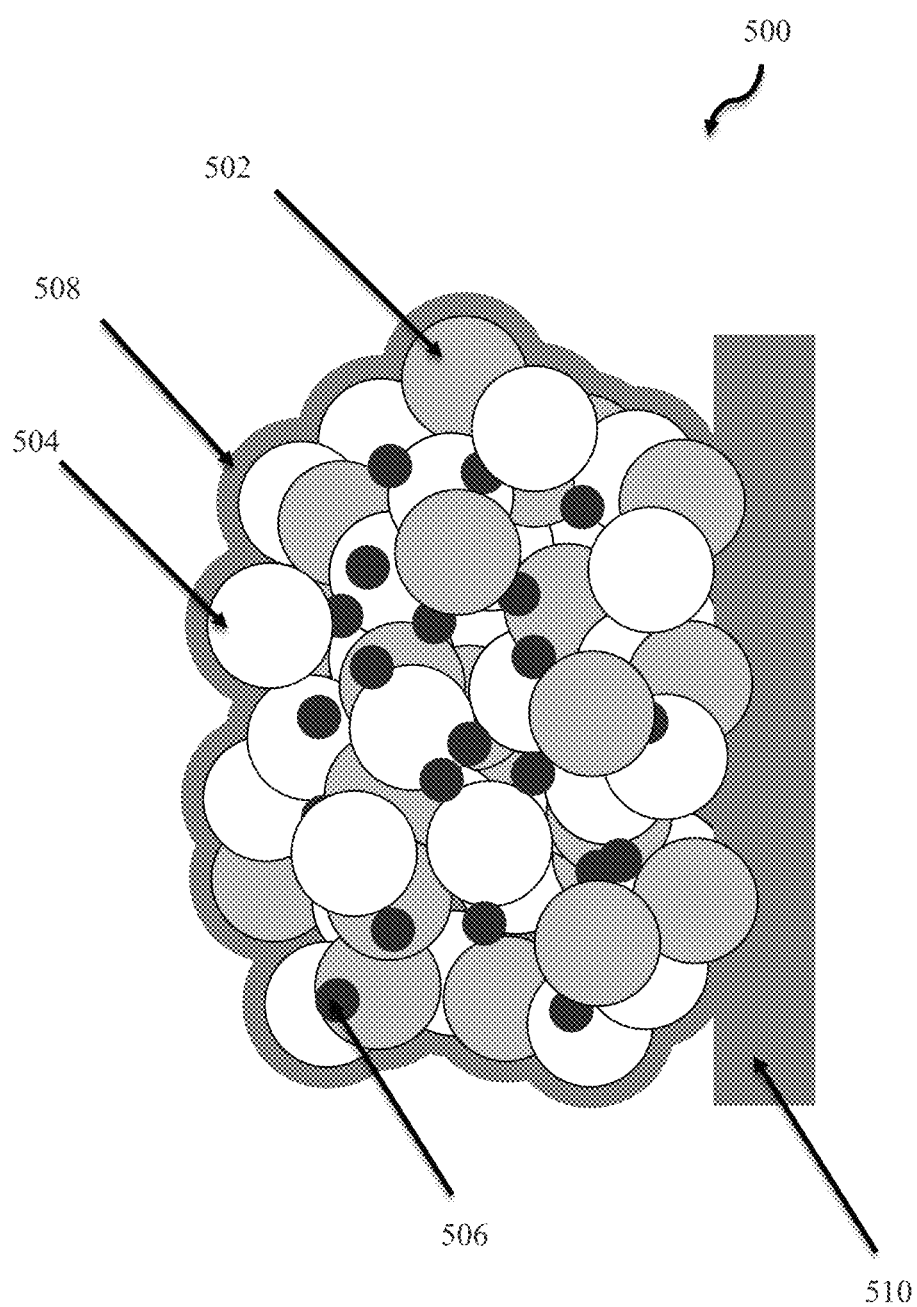
FIG. 5 is an illustration of a solid-state-electrolyte-electrode composite matrix coated with an artificial SEI layer in accordance with the present disclosure.

The methods and systems described herein are particularly useful for solid-state electrolyte (SSE) or a solid-state-electrolyte-electrode composite matrix substrates. The solid-state-electrolyte-electrode composite matrix is typically formed by first mixing appropriate ratios of solid-electrolyte powders with electrode powders, adding solvents and/or other necessary additives so as to yield a slurry, and then casting the slurry onto a current collector. The ratios of solid-electrolyte and electrode component powders are precisely adjusted so as to yield electrode powder-to-electrode powder and electrolyte-to-electrolyte physical connections throughout the resulting matrix. Examples of SSEs of the present disclosure include, but are not limited to, all-solid state electrolytes, such as inorganic solid electrolyte, solid polymer electrolytes, and composite polymer electrolytes. An example of an embodiment of a solid-state-electrolyte-electrode composite matrix coated with an artificial SEI layer in accordance with the present disclosure is shown in FIG. 5. A coated solid-state-electrolyte-electrode composite matrix 500 comprises electrode component powders 502 (gray particles), solid-electrolyte powders 504 (white particles), additives 506 (black particles), and an artificial SEI layer, 508. The additives, 506, may be a conductive additive or a binding additive. All particles and surfaces of matrix 500 are coated with artificial SEI layer 508, except for inter-particle contact points, thereby not contributing to inter-particle resistance. Matrix 500 is layered over a substrate, 510.

The SSE or solid-state-electrolyte-electrode composite matrix substrate of the present disclosure may be a continuous substrate or a discrete substrate. A "continuous substrate" as used herein refers to a substrate that possesses an aspect ratio of at least 10:1 between its two largest dimensions, and is sufficiently flexible so as to be wound onto itself in the form of a roll. It may be made up of various materials, including but not limited to metal, such as copper, aluminum, or stainless steel, or an organic material, such as polyimide, polyethylene, polyether ether ketone (PEEK), or polyester, polyethylene napthalate (PEN). A "discrete substrate" as used herein refers to a substrate that possesses an aspect ratio of <10:1 between its two largest dimensions and/or has a length dimension of at least 100 mm, and is sufficiently rigid so as to require handling as a discrete unit.

The thin films of the present disclosure comprise an artificial SEI layer that is formed by the reaction of two or more reagents during the solution-phase deposition method. The artificial SEI layer acts as a protective coating on constituent particles of the substrate while allowing the particles to maintain particle-to-particle connections. Accordingly, the methods described herein can be used to coat the surfaces of components of electrochemical devices such as batteries. In particular, for batteries, such as lithium ion batteries, applications that may benefit with the coatings described herein may include high-voltage cathodes, fast charging, silicon-containing anodes, cheaper electrolytes, and nanostructured substrate. Thus, in some embodiments, the thin films comprising the artificial SEI may be coated onto a substrate of a battery. In some embodiments, the substrate of the battery may be a composite of electrode and solid-electrolyte materials. In some embodiments, the electrode may be an anode or a cathode. In some embodiments, the substrate of the battery may be a free-standing film of solid-electrolyte.

Figure 4:
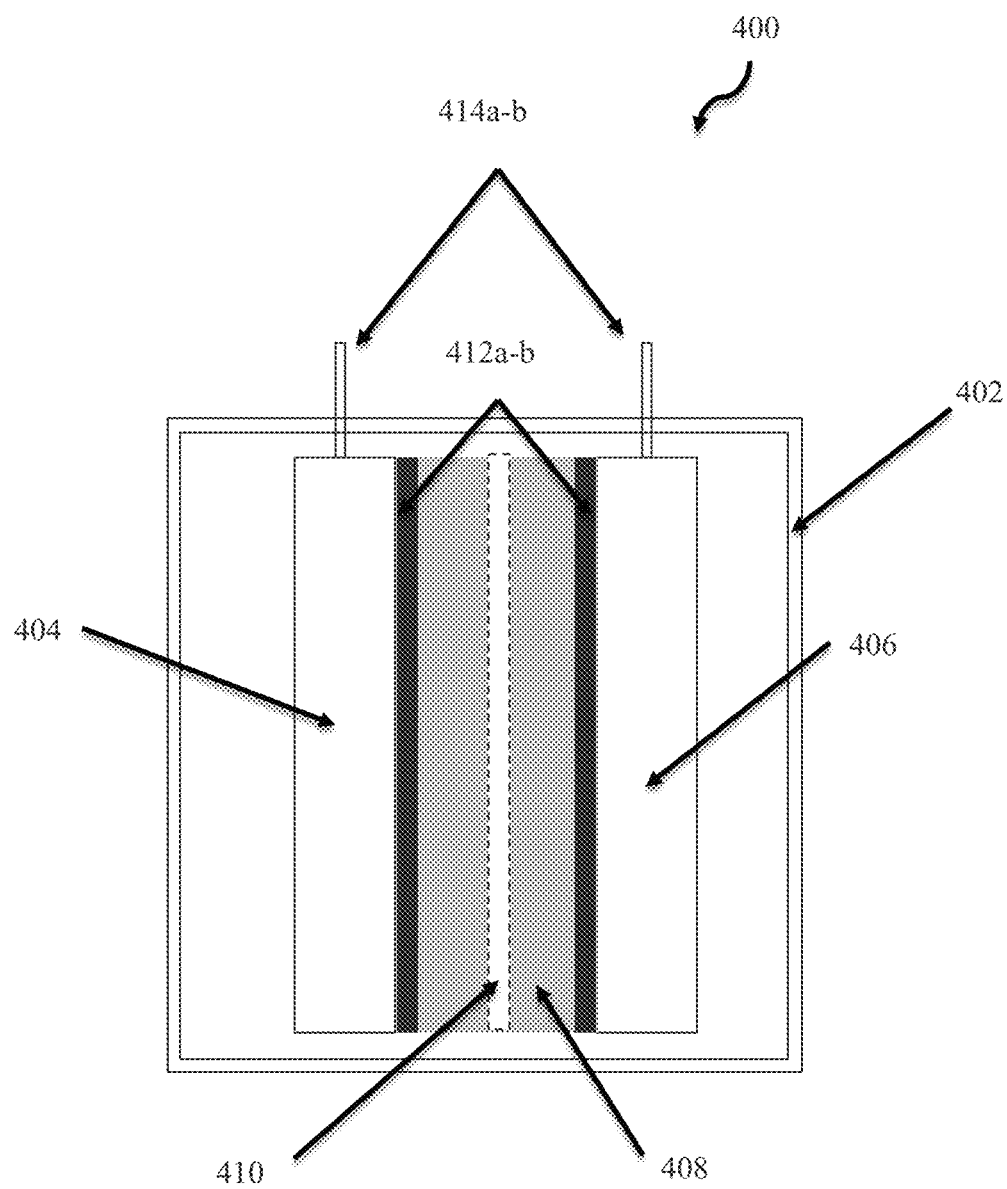
FIG. 4 is an illustration of a battery constructed from an anode and a cathode with solid electrolyte present in between in accordance with the present disclosure.

An example of an embodiment of a battery cell comprising an artificial SEI layer formed by a solution-phase deposition method in accordance with the present disclosure and applied at the interface between an anode and a solid electrolyte as well as a cathode and the solid electrolyte is shown in FIG. 4. A battery cell, 400, comprises a casing, 402, that houses electrodes 404 (anode) and 406 (cathode). The electrodes each have an electrical contact 414a-b that extends out of casing 402. A solid electrolyte, 408, is located between the two electrodes and is optionally separated by separator 410. Artificial SEI layers 412a-b are coated on the surface of each electrode. In some embodiments, only the anode/solid-electrolyte interface possesses an artificial SEI. In other embodiments, only the cathode/solid-electrolyte interface possesses an artificial SEI. In certain embodiments, the artificial SEI is applied to the anode surface before cell construction. In certain embodiments. the artificial SEI is applied to the cathode surface before cell construction. In certain embodiments, the artificial SEI is applied to the solid-electrolyte surface.

Figure 1:
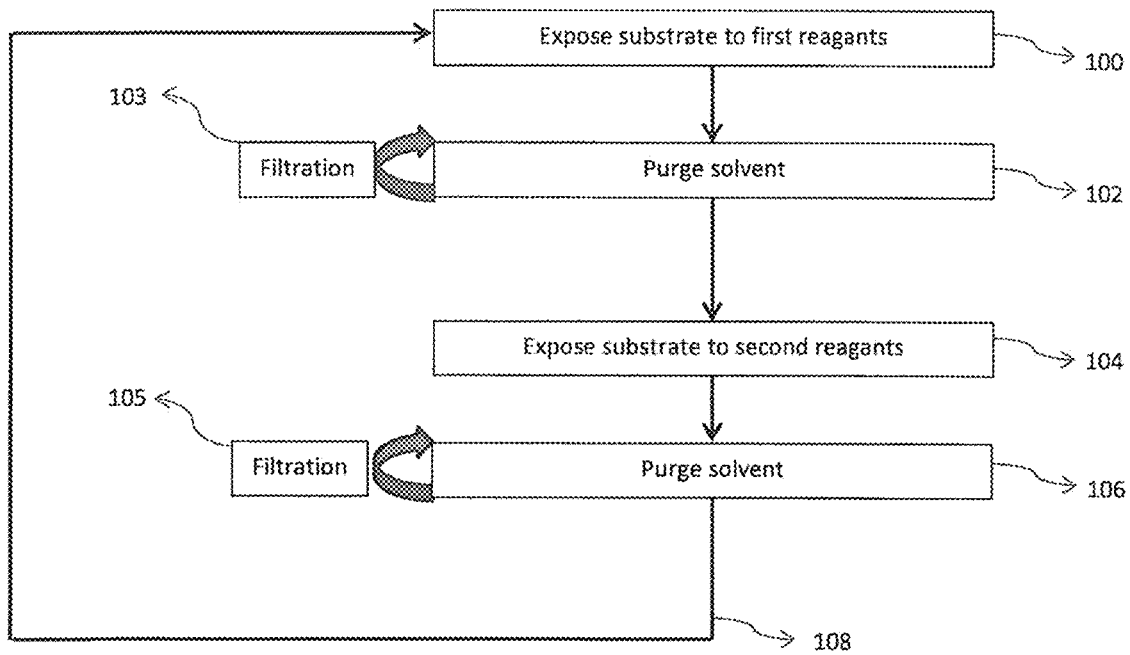
FIG. 1 is a general flow scheme for an embodiment of a solution-phase deposition method in accordance with the disclosure. The method includes rinsing/purge steps as well as filtration steps.

A simple flow scheme for an embodiment of a solution-phase deposition method in accordance with the present disclosure is shown in FIG. 1. While the embodiment of FIG. 1 is related to a method for coating a thin film onto the surface of a battery substrate, this description is only representative of a component to be deposited using the methods and systems provided herein and is not to be construed as being limited in any way.

Referring to FIG. 1, a battery substrate, for example, may be exposed, in 100, to a first liquid solution comprising a first reagent(s) in a first reaction chamber to produce a layer comprising an adsorbed first reagent(s) on the surface of the substrate. As described herein, a substrate may include a battery electrode, a solid-state electrolyte (such as a free-standing film) or a composite of electrode and solid-state electrolyte materials.

The first liquid solution comprises at least a first reagent. The first reagent may be any compound that is able to react with the material of the substrate (i.e., the component to be coated) to form a self-limiting layer. In certain embodiments, the first reagent is a metalorganic compound. Examples of such metalorganics include, but are not limited to, aluminum tri-sec butoxide, titanium ethoxide, niobium ethoxide, trimethyl aluminum, and zirconium tert-butoxide. In another embodiment, the first reagent comprises an aqueous solution comprising an ionic compound. Examples include, but are not limited to, zinc acetate, cadmium chloride, zinc chloride, zirconium chloride, and zinc sulfate. In some embodiments, the first solution may vary in pH. In some embodiments, the first liquid solution may be a solution including ionic compounds of both cationic and anionic precursors that react to form a solid film; in this case the film growth is limited by the kinetics of the film-forming reaction. In some embodiments, the first liquid solution may be a solution including both metalorganic and oxidizing precursors that react to form a solid film; in this case the film growth is limited by the kinetics of the film-forming reaction.

In the embodiments where the first reagent is a metalorganic, the first liquid solution may also comprise a solvent that is used to dissolve or complex the first reagent. Preferred solvents include organic solvents, such as an alcohol, for example, isopropyl alcohol or ethanol, alcohol derivatives such as 2-methoxyethanol, slightly less polar organic solvents such as pyridine or tetrahydrofuran (THF), or nonpolar organic solvents such as hexane and toluene.

In one embodiment, the first liquid solution is contained within a first reaction chamber. The reaction chamber must be a device large enough to accommodate receiving the substrate and to contain the amount of liquid solution to be used in the self-limiting layer producing reaction. Such devices that may be used as the reaction chamber include, but are not limited to, tanks, baths, trays, beakers, or the like.

The substrate may be transferred to the first reaction chamber by a conveying apparatus. The conveying apparatus, as described in more detail below, may be adapted and positioned in such a way as to guide or direct the substrate into and out of the first chamber.

In certain embodiments, the substrate may be submerged, either fully or partially, into the first and second liquid solutions of the first and second reaction chambers, respectively. In other embodiments, the substrate may be sprayed with the first and second liquid solutions in first and second reaction chambers, respectively.

In another embodiment, the substrate may be conveyed underneath a slot die coater, from which the first liquid solution is continuously dispensed to generate a two-dimensional liquid film. The speed at which the substrate is conveyed and the flow rate of fluid through the die determines the thickness of the liquid film. The solvent may then simply evaporate to create a solid film of the dissolved components, or the liquid film may possess reactants that react to precipitate a thin film comprising an artificial SEI on the surface of the substrate. The resulting solid film may be as thin as one atomic monolayer or as thick as 100 microns. The reaction may occur while the solvent is still present or after the solvent has evaporated. If residual solvent remains until after the end of the coating process, it may be removed by various techniques, such as a doctor blade, air knife, metering knife or similar. The entire slot die coating process may then be repeated to generate new films of different chemical composition or to simply generate thicker coatings of the same chemical composition. In this case, the reaction chambers simply comprise the area where the slot-die coater is located, and do not necessarily resemble an enclosed space as is suggested by the term "chamber."

In another embodiment, the substrate may be conveyed through a tank containing a coating solution and a gravure roller. In this embodiment, the gravure roller continuously transfers fluid from the dip tank to the adjacent web due to preferential surface tension (wetting) of the web and the roller by the coating solution. As in slot-die coating, the result is initially a two-dimensional liquid film on the surface of the substrate. Particular solution, web and roller compositions, for example, can influence the surface tension of the fluid on both the web and the roller, thereby influencing the coating efficiency of the process. The solvent may then simply evaporate to create a solid film of the dissolved components, or the liquid film may possess reactants that react to precipitate a thin film comprising an artificial SEI on the surface of the substrate. The resulting solid film may be as thin as one atomic monolayer or as thick as 100 microns. The reaction may occur while the solvent is still present or after the solvent has evaporated. If residual solvent remains until after the end of the coating process, it may be removed by various techniques, such as a doctor blade, air knife, metering knife or similar. The entire gravure coating process may then be repeated to generate new films of different chemical composition or to simply generate thicker coatings of the same chemical composition.

Multiple sequential, repeated steps of the same process (i.e., slot-die or gravure coating) can be performed with the same or different solutions. Solutions may be separated (as in first solution, second solution, etc.) to avoid cross-contamination, for instance, or to prevent homogenous nucleation when a heterogeneous film-forming reaction is preferred.

The substrate is exposed to the first liquid solution for a sufficient time (a "residence time") so as to allow the first reagent(s) to adsorb onto the substrate surface and generate a continuous layer (i.e. self-limiting layer). Examples of process variables that may influence this step include solution and substrate temperature, residence time and reagent concentration.

An advantage of the present methods and systems is that the solvents used vary in specific heat capacity and can also be employed as both heat transfer and precursor transfer media—yielding faster, more efficient heating of substrate. Precursors dissolved into solution are also much more stable with regards to air ambient exposure as compared to their pure analogs, yielding improved safety and easier handling.

Optionally, the substrate may undergo a first rinsing/purge step, 102, whereby excess first reagent from step 100 is removed with a solvent. Here, most or all of the non-adsorbed first reagent will be removed from the substrate surface before moving the substrate to the next process step. Key process variables include solvent temperature, substrate temperature, and residence time. 102 is shown in FIG. 1 as a single step, however, in certain embodiments, this step may be repeated or may have additional rinsing/purging steps to improve first reagent removal.

The rinsing step leaves exactly one saturated (i.e., purified) first layer on the substrate and a residual solution comprising the first solvent, unreacted first reagent(s) and other reaction byproducts in the reaction chamber.

As an additional optional step, to recover the solvent used in the rinsing step and any unreacted reagent, the residual solution may be passed to a filtration step, 103. The filtration step separates the solvent from the unreacted reagent (and any reaction byproduct). The filtration step also prevents cross-contamination between chambers and avoids slow contamination of rinse solutions with reagent over the course of operation. Continuous filtering of rinse baths can not only maintain purity of rinse solvent but can also act as a system for materials recovery, thereby boosting the materials utilization efficiency of the process. Any filtration techniques known in the art may be used. Preferred technologies include, but are not limited to, membrane separation, chemical precipitation, ion-exchange, electrochemical removal, physical adsorption, and flow filtration chromatography.

The separated solvent may be recycled back to the rinsing step, 102, for reuse. Likewise, the filtered unreacted first reagent(s) may also be recycled back to 100 for further use in the process (not shown).

A partially coated battery substrate, having a layer (i.e., a self-limiting layer) comprising an adsorbed first reagent may then be exposed, in 104, to a second liquid solution comprising a second reagent in a second reaction chamber.

In some embodiments, the second liquid solution may comprise an oxidizing agent, such as an oxide or chalcogenide source, examples of which include, but are not limited to, water, thioacetamide, and sodium sulfide. A solvent may also be present, which may comprise of polar or nonpolar organic solvents or may just be water. In other embodiments, the second liquid solution may also contain a nitrogen-containing reagent such as ammonia or hydrazine. In some embodiments, the second solution may also vary in pH.

The second reagent is of a different and distinct composition as compared to the first reagent. The second reagent is selected to be able to react with the adsorbed first reagent to produce a complete monolayer of artificial SEI compound coated onto the substrate.

In some embodiments, the entire film may be formed by reagents exposed to the substrate from the first liquid solution alone. In this case, the second solution may be skipped entirely.

In some embodiments, the compound formed may comprise a metal oxide, such as $Al_2O_3$ and $TiO_2$. In other embodiments, the compound formed may comprise Transition Metal Dichalcogenides (TMDs). Typical examples of this class of materials follow the general chemical formula $MX_2$, where M is a transition metal such as Mo, W, Ti, etc., and X is either S or Se. In some embodiments, the compound is composed of any combination of the following polymers: polyethylene oxide (PEO), poly vinyl alcohol (PVA), poly methyl methacrylate (PMMA), poly dimethyl siloxane (PDMS), poly vinyl pyrollidone (PVP). Such polymers, when combined with lithium salts such as $LiClO_4$, $LiPF_6$ or $LiNO_3$, among others, can yield a solid polymer electrolyte thin film. In some embodiments, the compound may comprise, for example, a sulfide or selenide of Mo, Ti, or W. These materials vary widely in their electronic properties, such as bandgap, and thus can be used to create tailored semiconductor heterojunctions that will, for example, block electron transfer necessary for degrading reactions in lithium-ion battery operation. Specifically, such mechanisms can be exploited to block degrading reactions on both anode and cathode surfaces.

In some embodiments, the compound formed may be selected from the group consisting of:
(a) binary oxides of type $A_xO_y$, where A is an alkali metal, alkali-earth metal, transition metal, semimetal or metalloid and x and y are stoichiometric coefficients;
(b) ternary oxides of type $A_xB_yO_z$, where A and B are any combination of alkali metal, alkali-earth metal, transition metal, semimetal or metalloid and x, y and z are stoichiometric coefficients;
(c) quaternary oxides of type $A_wB_xC_yO_z$, where A, B and C are any combination of alkali metal, alkali-earth metal, transition metal, semimetal or metalloid and w, x, y and z are stoichiometric coefficients;
(d) binary halides of type $A_xB_y$, where A is an alkali metal, alkali-earth metal, transition metal, semimetal or metalloid, B is a halogen and x and y are stoichiometric coefficients;
(e) ternary halides of type $A_xB_yC_z$, where A and B are any combination of alkali metal, alkali-earth metal, transition metal, semimetal or metalloid, C is a halogen and x, y and z are stoichiometric coefficients;
(f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;
(g) binary nitrides of type $A_xN_y$, where A is an alkali metal, alkali-earth metal, transition metal, semimetal or metalloid and x and y are stoichiometric coefficients;

(h) ternary nitrides of type $A_xB_yN_z$, where A and B are any combination of alkali metal, alkali-earth metal, transition metal, semimetal or metalloid and x, y and z are stoichiometric coefficients;

(i) quaternary nitrides of type $A_wB_xC_yN_z$, where A, B and C are any combination of alkali metal, alkali-earth metal, transition metal, semimetal or metalloid and w, x, y and z are stoichiometric coefficients;

(j) binary chalcogenides of type $A_xB_y$, where A is an alkali metal, alkali-earth metal, transition metal, semimetal or metalloid, B is a chalcogen and x and y are stoichiometric coefficients;

(k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;

(l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;

(m) binary carbides of type $A_xC_y$, where A is an alkali metal, alkali-earth metal, transition metal, semimetal or metalloid and x and y are stoichiometric coefficients;

(n) binary oxyhalides of type $A_xB_yO_z$, where A is an alkali metal, alkali-earth metal, transition metal, semimetal or metalloid, B is a halogen and x, y and z are stoichiometric coefficients;

(o) binary arsenides of type $A_xAs_y$, where A is an alkali metal, alkali-earth metal, transition metal, semimetal or metalloid and x and y are stoichiometric coefficients;

(p) ternary arsenides of type $A_xB_yAs_z$, where A and B are any combination of alkali metal, alkali-earth metal, transition metal, semimetal or metalloid and x, y and z are stoichiometric coefficients;

(q) quaternary arsenides of type $A_wB_xC_yAs_z$, where A, B and C are any combination of alkali metal, alkali-earth metal, transition metal, semimetal or metalloid and w, x, y and z are stoichiometric coefficients;

(r) binary phosphates of type $A_x(PO_4)_y$, where A is an alkali metal, alkali-earth metal, transition metal, semimetal or metalloid and x and y are stoichiometric coefficients;

(s) ternary phosphates of type $A_xB_y(PO_4)_z$, where A and B are any combination of alkali metal, alkali-earth metal, transition metal, semimetal or metalloid and x, y and z are stoichiometric coefficients; and (t) quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

In the case that the reaction is between a non-ionic precursor such as a metalorganic with an oxidizer, as in the hydrolysis of trimethylaluminum, organic moieties are removed and replaced with metal-oxygen-metal bonds, until all bonds are fully saturated. In the case that the reaction is between two ionic solutions, as in the reaction between solutions of $Cd^{2+}$ and $S^{2-}$ ions, the high solubility product constant of the reaction promotes precipitation of an ionic compound, in this case CdS, with the substrate promoting heterogeneous film formation by minimizing surface energy.

Similar to 102, the electrode from 104 is then directed to a second rinsing/purge step, 106, to remove non-adsorbed/unreacted second reagent.

In certain embodiments, the thin film comprising the artificial SEI may have a thickness of about 0.5 nm to 100 µm. For example, the thin film may be a thickness within the range of 0.5 nm-10 nm, 10 nm-50 nm, 50 nm-100 nm, 100 nm-500 nm, 500 nm-1 µm, 1 µm-10 µm, 10 um-50 µm, or 50 µm-100 µm.

In some embodiments, 100 to 106 may be repeated any number of times until a desired thickness of artificial SEI coating is formed onto the substrate. This scheme is indicated by 108, where the substrate coated with the artificial SEI is directed back to step 100 for further processing (forming a loop). In some embodiments, the steps will be repeated but with different precursors, thereby yielding coatings comprising of stacks of artificial SEI layers comprising various compounds.

Additionally, during 102 and 106, the rinse or purge solvent may be either continuously or periodically filtered so that unreacted reagent(s) can be separated and recovered from solvent. This filtering step is indicated in steps 103 and 105, respectively. Both precursor and solvent can then be potentially recycled back into the process. Here, the recycling of the solvent is shown by the return arrows. These filtration steps will save significant material costs over the lifetime of the apparatus. For every wash and rinse step, a filtration step may be incorporated into the design. The filtration technique is preferably tuned to the types of reagents used in steps 100 and 104. For instance, an aqueous ionic solution may require the types of filtration columns used in deionizers to be adequately filtered. However, an organometallic may be better removed by a tangential flow filtration system that excludes by molecular weight, for instance.

Figure 2:
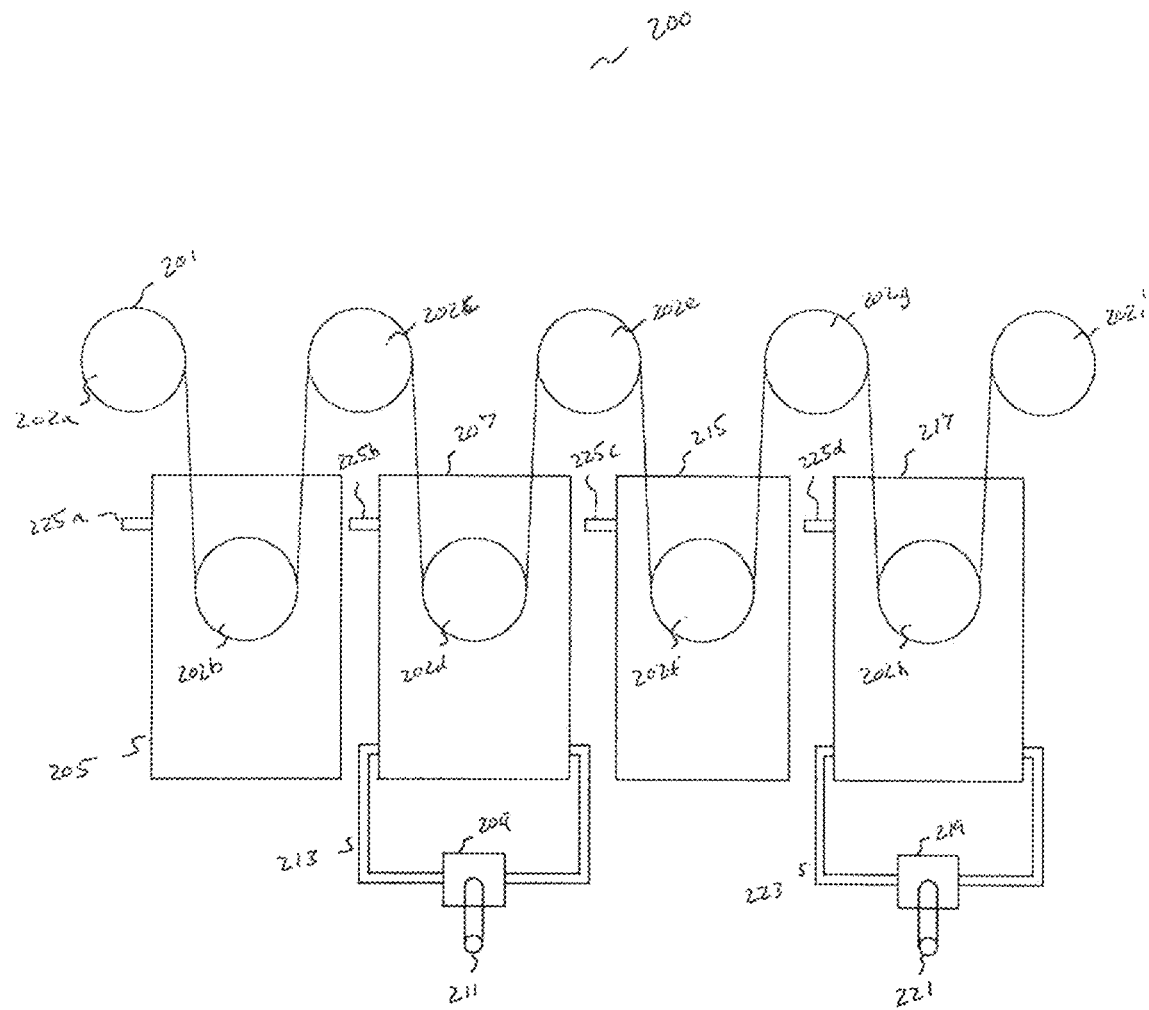
FIG. 2 is a schematic drawing of one embodiment of a system for coating a thin film comprising an artificial SEI layer onto the surface of a battery substrate in accordance with the disclosure.

A schematic drawing of an embodiment of a system for coating a thin film comprising an artificial SEI onto the surface of a substrate is shown in FIG. 2. In FIG. 2, the reaction chambers are shown as sequential tanks or baths containing reaction solutions; the substrate is conveyed into the reaction chambers with the assistance of a conveying apparatus. While the embodiment of FIG. 2 is related to a method for coating a thin film comprising an artificial SEI onto the surface of a battery substrate, this description is only representative of a component to be coated using the methods and systems provided herein and is not to be construed as being limited in any way.

The conveying apparatus of FIG. 2 is particularly suited and adapted in such a way as to guide or direct the battery substrate into and out of the first and second reaction chambers in a sequential manner. The conveyance apparatus, which is preferably automated, comprises a series of rollers, such as tensioning rollers, positioned in such a manner as to guide or direct the substrate into and out of the first and second reaction chambers. In this way, the system can provide for a continuous liquid deposition process for coating a thin film comprising an artificial SEI onto the surface of a substrate. The series of rollers, 202*a-i*, are driven by a conveying motor (not shown). The rollers, 202*a-i*, are operated and oriented in such a way to enable a substrate, 201, to be conveyed through the system as discussed in greater detail below. The system, 200, also comprises a series of chambers, 205, 207, 215, and 217.

In certain embodiments, the first and second reaction chambers may include a sensor for determining or measuring the volume of first or second liquid solution that is in the respective reaction chamber or the concentration of precursor in each respective reaction chamber. Additionally, the first and second reaction chambers may also comprise a regulating valve that is electronically actuated by the sensor. When the sensor (such as a float switch) determines that the liquid solution is too low, the valve opens up, allowing more liquid solution from another source to flow into the reaction chamber. In some cases, a pump (such as a peristaltic pump) is used to drive the liquid solution into the reaction chamber. When the sensor determines that the liquid solution is at the desired level, the valve closes, preventing excess liquid solution from flowing into the reaction chamber. In some cases, if the sensor determines that the liquid solution is too high in the reaction chamber, the valve opens up, allowing the excess liquid to flow out of the reaction chamber. In the case that the sensor detects precursor concentration, a valve may expose the tank to a stock solution of high precursor concentration in the circumstance that the tank precursor solution is detected to be low, and vice-versa. An example of such a sensor is an ion-selective electrode.

In further embodiments, the system comprises a first rinsing chamber located between the first and second reaction chambers. The first rinsing chamber contains the first rinsing solution comprising the first solvent for rinsing the substrate conveyed to the first rinsing chamber by the conveyance apparatus to produce a saturated first layer on the substrate and a first residual solution comprising the first solvent and unreacted first reagent.

Likewise, the system may also comprise a second rinsing chamber located after the second reaction chamber. The second rinsing chamber contains a second rinsing solution comprising a second solvent for rinsing the substrate conveyed to the second rinsing chamber by the conveyance apparatus to produce a thin film comprising an artificial SEI coated onto the substrate.

Chamber 205 is a first reaction chamber that contains a first liquid solution comprising a first reagent and a solvent.

Chamber 207 is a first rinsing chamber located after the first reaction chamber, 205, contains a first rinsing solution comprising a first solvent. A first filtration apparatus, 209, is connected to the first rinsing chamber, 207. First filtration apparatus 209 has a residue tube, 213, that is connected to the first rinsing chamber, 207, and a permeate collection tube, 211.

Another chamber, 215, is a second reaction chamber located after the first rinsing chamber, 207, and contains a second liquid solution comprising a second reagent and a solvent.

Chamber 217 is a second rinsing chamber located after the second rinsing chamber, 215. Second rinsing chamber 217 contains a second rinsing solution comprising a solvent. A second filtration apparatus, 219, is connected to the second rinsing chamber, 217. Second filtration apparatus 219 has a residue tube, 223, that is connected to the second rinsing chamber, 217, and a permeate collection tube, 221.

System 200 further comprises valves 225a-d located on each of the chambers, 205, 207, 215, and 217, respectively. The valves, 225a-d, are connected to a replenishing source (not shown), which provide, when needed, additional first liquid solution, second liquid solution, first reagent, second reagent, or solvent, as in the case for first and second chambers 215 and 215, respectively, or more first rinsing solution or second rinsing solution, as in the case of first and second rinsing chambers, 207 and 217, respectively. Valves 225a-d may be electrically-actuated and opened by the triggering of a sensor (not shown), which is adapted to monitor or measure the volume or concentration of liquid solution in a chamber. The sensors may be dipped into the liquid solution of each chamber.

In operation, a first portion of a substrate, 203, is first placed on a first roller, 202a, which is part of conveying apparatus 201. Typically, the first portion is attached, such as by glue or tape, to a leader material that is strung through the rest of rollers 202b-i. In this way, the leader material can guide the substrate through the conveying apparatus, 201, during the process. The leader material may then be removed from the substrate once the portion of the substrate that was placed on roller 202a is conveyed to roller 202i or when coating of the entire substrate is completed. An example of such a leader material may be from a previous roll of substrate. In advance of the coating of a specific substrate e, the previous roll of substrate may have had a long trailing length with no active material (just foil). Once the previous roll has been processed, this remnant is left strung on the conveying apparatus, and the active material can be slit and removed. The remnant will then act as a leader to guide the next roll of substrate through the conveying apparatus.

Accordingly, the first portion of the substrate, 203, is conveyed into first reaction chamber 205 by movement of second roller 202b, which is also located within first reaction chamber 205. First portion of substrate 203 is exposed within first reaction chamber 205 to a first liquid solution to produce a self-limiting layer comprising an adsorbed first reagent on the surface of the first portion of the substrate. The first portion of substrate, 203, is left in first reaction chamber 205 for a certain residence time in order for the reaction to take place. Once the reaction is substantially completed, the first portion of substrate 203 is withdrawn from first reaction chamber 205 by moving upward to third roller 202c.

While this is occurring, a second portion of substrate 203 is conveyed into first reaction chamber 205. Conveying apparatus operates in a continuous manner until the desired amount of substrate is coated with thin film.

Returning back to the first portion of substrate 203, the first portion is then conveyed to a first rinsing chamber, 207 by movement of fourth roller 202d, which is also located within first rinsing chamber 207. The first rinsing chamber, 207, contains a first rinsing solution comprising a first solvent for rinsing the substrate 203 to produce a saturated first layer on the substrate and a first residual solution comprising the first solvent and unreacted first reagent.

The system may also comprise a filtration apparatus for separating unreacted reagent from the solvent in the first and second rinsing solutions. The filtration apparatus may be any device that can perform such a separation. Preferably, the filtration apparatus is selected from one of the following: a membrane, a filtration column, or a chromatographic column, a chemical or electrochemical separation tank, or an adsorption column.

When needed, the first rinsing solution is passed to first filtration apparatus 209 to separate the unreacted first reagent from the first solvent. The first filtration apparatus, 209, produces a permeate stream enriched in unreacted first reagent and depleted in first solvent and a residue stream enriched in first solvent and depleted in unreacted first reagent compared to the first rinsing solution. The permeate stream is collected in permeate collection tube 211, which may be recycled or sent back to the first reaction chamber, 205. The residue stream is recycled back to the first rinsing chamber, 207, via residue tubing 213. Filtration apparatus, 209, may operate periodically or continuously. From the first rinsing chamber 207, the first portion of substrate 203 is then withdrawn from first rinsing chamber 207 by moving upward to fifth roller 202e.

First portion of substrate 203 is then conveyed into second reaction chamber 215, by moving downward to sixth roller 202f, which is also located within second reaction chamber 215. Second reaction chamber 215 comprises a second liquid solution comprising at least a second reagent. Within second reaction chamber 215, the substrate, 203, is exposed to the second liquid solution, which reacts with the first adsorbed reagent to produce a monolayer of thin film comprising an artificial SEI coated onto the surface of the substrate. After the reaction is substantially completed, the first portion of substrate 203 is then withdrawn from second reaction chamber 215 by moving upward to seventh roller 202g.

Next, first portion of substrate 203 is conveyed to a second rinsing chamber, 217, by moving downward to eighth roller 202h, which is also located within second rinsing chamber 217. The second rinsing chamber, 217, contains a second rinsing solution comprising a second solvent for rinsing the substrate to produce a purified monolayer of artificial SEI coated onto the surface of the substrate, 203, and a second residual solution comprising the second solvent and unreacted second reagent.

Similar to the first rinsing solution, the second rinsing solution may be sent to a second filtration apparatus, 219. Second filtration apparatus 219 produces a permeate stream enriched in unreacted second reagent and depleted in second solvent and a residue stream enriched in second solvent and depleted in unreacted second reagent compared to the second rinsing solution. The permeate stream is collected in permeate collection tube 221, which may be recycled or sent back to the second reaction chamber, 215. The residue stream is recycled back to the second rinsing chamber, 217, via residue tubing 223. Filtration apparatus, 219, may operate periodically or continuously.

Finally, first portion of substrate 203 is withdrawn from second rinsing chamber 217 being conveyed up to ninth roller 202i. From here, the first portion may be collected or rolled up until the rest of the desired portions of the substrate are coated with a thin film comprising an artificial SEI.

A similar embodiment of the present disclosure to that described in FIG. 2 can involve replacement of bath-deposition reaction chambers 205 and 215 with slot-die or gravure coating reaction chambers (not shown). In such an embodiment, rinse chambers 207 and 217 may or may not be present, depending on the need for a rinse step. In such an embodiment or even in the embodiment described in FIG. 2, an excess solution removal technique such as an air knife, doctor blade, metering knife or similar can be employed in lieu of a rinse step. In another similar embodiment, 215 may be entirely absent, as the entire deposition reaction may be performed in 205. As such, the apparatus of the present disclosure, both in terms of deposition equipment and conveying equipment, can be considered to be modular and assembled in any specific manner so as to facilitate a specific solution-deposition process.

Figure 3:
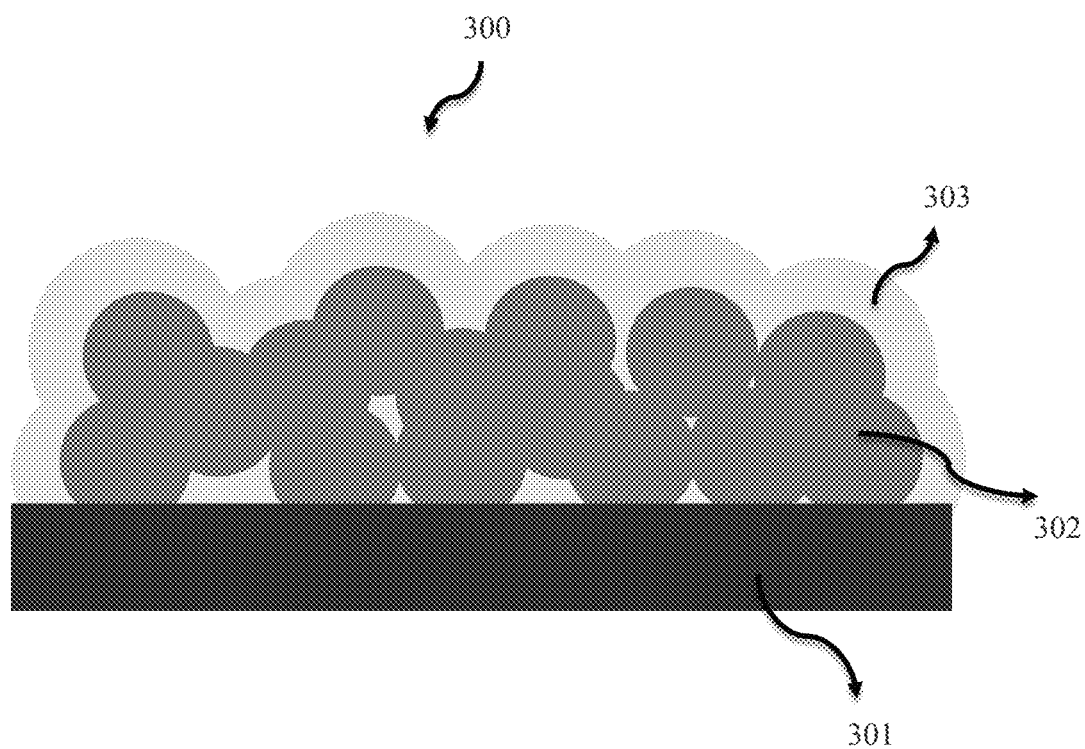
FIG. 3 is an illustration of a thin film comprising an artificial SEI layer in accordance with the present disclosure coated on to the surface of a substrate.

An example of an embodiment of a coated battery substrate in accordance with the present disclosure is shown in FIG. 3. A coated substrate, 300, comprises substrate constituent particles (i.e., an active layer), 302, that are coated with a thin film comprising an artificial SEI, 303. The thin film comprising the artificial SEI, 303, may be between 0.5 nm to 100 μm thick. The substrate constituent particles, 302, are situated on top of a substrate, 301, which in this case is a foil substrate. The thin film coating covers all particle surfaces except inter-particle contact points, thereby not contributing to inter-particle resistance. In embodiments where coated substrate 300 is an electrode, the coated electrode would be located adjacent to a solid-state electrolyte within a battery cell.

Methods of the present disclosure can be implemented using, or with the aid of, computer systems. The computer system can be involved in many different aspects of the operation the present methods, including but not limited to, the regulation of various aspects of the conveyance apparatus, such as by directing movement of the conveyance apparatus by moving the component to be coated into and out of the reaction chambers; by controlling the timing of the opening and closing of valves; detecting the volume of liquid via sensor readings, directing the flow of liquids, such as reagents and buffers, into the reaction chambers; and regulating pumps. In some aspects, the computer system is implemented to automate the methods and systems disclosed herein.

The computer system can include or be in communication with an electronic display that comprises a user interface (UI) for providing, for example, one or more results of sample analysis. Examples of UFs include, without limitation, a graphical user interface (GUI) and web-based user interface.

The methods and systems provided above are now further described by the following examples, which are intended to be illustrative, but are not intended to limit the scope or underlying principles in any way.

Examples

Example 1: Deposition of $TiO_2$

Titanium isopropoxide is first dissolved in an appropriate anhydrous solvent, such as dry isopropyl alcohol, is adsorbed onto the surface of a substrate. The component to be coated (such as an electrolyte or electrolyte-electrode composite) is then cleansed of excess, non-adsorbed titanium isopropoxide using a rinse solvent. Next, the substrate is introduced to a solution of an oxidizer, such as water, dissolved in an appropriate solvent, such as isopropyl alcohol. Hydrolysis results in loss of alkoxide ligand to 2-propanol, leaving an adsorbed moiety with added hydroxyl. In a further step, excess solution of water and solvent is removed by a rinse solvent. A single monolayer of titanium oxide is produced. The process may be repeated to yield increasing thickness.

Example 2: Deposition of CdS

Cadmium sulfate ($CdSO_4$) is first dissolved in an aqueous solution, yielding $Cd^{2+}$ ions adsorbed onto a surface of a substrate. The substrate is cleansed of excess, non-adsorbed $Cd^{2+}$. The substrate is then introduced to an aqueous solution containing an anionic sulfur precursor, such as thiourea or $Na_2S$. The pH of the precursor solutions may be varied to control rate of reaction. The high solubility product constant of CdS in this reaction results in the precipitation of a single monolayer of CdS on the substrate surface, where surface energy minimization promotes nucleation.

Example 3: Deposition of TiN

A substrate (or other component to be coated) is submerged or exposed to a solution of titanium ethoxide dissolved anhydrous ethanol. The substrate is cleansed of excess precursor. The substrate is exposed to a solution containing a nitrogen precursor, such as ammonia in pyridine or hydrazine in THF. Reaction of precursor with adsorbed titanium ethoxide results in a single monolayer of TiN.

It should be understood from the foregoing that, while particular implementations have been illustrated and described, various modifications can be made thereto and are contemplated herein. It is also not intended that the present disclosure be limited by the specific examples provided within the specification. While certain embodiments have been described with reference to the aforementioned specification, the descriptions and illustrations of the preferable embodiments herein are not meant to be construed in a limiting sense. Furthermore, it shall be understood that all aspects of the present disclosure are not limited to the specific depictions, configurations or relative proportions set forth herein which depend upon a variety of conditions and variables. Various modifications in form and detail of the embodiments will be apparent to a person skilled in the art. It is therefore contemplated that the present disclosure shall also cover any such modifications, variations and equivalents.

What is claimed is:

1. A method for depositing a thin film comprising an artificial solid-electrolyte interphase (SEI) onto a surface of a solid-state electrolyte or a solid-state-electrolyte-electrode composite matrix, the method comprising:
    (a) providing the solid-state electrolyte or the solid-state-electrolyte-electrode composite matrix onto a conveyance apparatus;
    (b) transferring, by the conveyance apparatus, the solid-state electrolyte or the solid-state-electrolyte-electrode composite matrix to a first reaction chamber containing a first liquid solution comprising at least a first reagent;
    (c) exposing, by the conveyance apparatus, the solid-state electrolyte or the solid-state-electrolyte-electrode composite matrix to the first liquid solution in the first reaction chamber to yield a layer partially coated with the at least first reagent chemically bonded onto the surface of the solid-state electrolyte or the solid-state-electrolyte-electrode composite matrix;
    (d) rinsing, in the first reaction chamber, the layer with a first rinsing solution comprising a first solvent to remove unreacted first reagent;
    (e) transferring, by the conveyance apparatus, the solid-state electrolyte or the solid-state-electrolyte-electrode composite matrix from (d) to a second reaction chamber containing a second liquid solution comprising at least a second reagent;
    (f) exposing, by the conveyance apparatus, the solid-state electrolyte or the solid-state-electrolyte-electrode composite matrix to the second liquid solution in the second reaction chamber, wherein the at least second reagent reacts with the at least first reagent chemically bonded onto the surface of the solid-state electrolyte or the solid-state-electrolyte-electrode composite matrix to produce the artificial SEI thin film comprising a monolayer on the surface of the solid-state electrolyte or the solid-state-electrolyte-electrode composite matrix, the monolayer comprising a compound generated from the reaction of the at least first reagent and the at least second reagent; and
    (g) rinsing, in the second reaction chamber, the artificial SEI thin film with a second rinsing solution comprising a second solvent to remove unreacted second reagent.

2. The method of claim 1, wherein the thin film comprising the artificial SEI has a thickness from about 0.5 nanometers (nm) to 100 micrometers (μm), the solid-state electrolyte or the solid-state electrolyte-electrode composite matrix has a thickness of 10 nm to 1,000 μm, or the solid-state electrolyte or the solid-state-electrolyte-electrode composite matrix has pores ranging in size from 1 nm to 100 μm.

3. The method of claim 1, wherein the solid-state electrolyte or the solid-state-electrolyte-electrode composite matrix in (a) is a continuous substrate, having an aspect ratio of more than 10:1 between its largest dimensions.

4. The method of claim 1, wherein the solid-state electrolyte or the solid-state-electrolyte-electrode composite matrix in (a) is a discrete substrate, having a length dimension of at least 100 mm, and is sufficiently rigid to require handling as a discrete unit.

5. The method of claim 3, wherein the solid-state electrolyte or the solid-state-electrolyte-electrode composite matrix is composed of a flexible foil current collector that is coated with a composite matrix of solid electrolyte and one or more electrode materials.

6. The method of claim 5, wherein the foil current collector comprises a metal.

7. The method of claim 6, wherein the metal is Cu, Al or stainless steel.

8. The method of claim 3, wherein the solid-state electrolyte or the solid-state-electrolyte-electrode composite matrix is a film of a solid-polymer-electrolyte.

9. The method of claim 5, wherein the electrode materials comprise one or more of the following: graphite, Si, Sn, Ge, Al, P, Zn, Ga, As, Cd, In, Sb, Pb, Bi, SiO, $SnO_2$, Si, Sn, lithium metal, $LiNi_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_2O_5$, sulfur or $LiCoO_2$ where x, y and z are stoichiometric coefficients.

10. The method of claim 5, wherein the solid electrolyte comprises one or more of the following: $Li_wLa_xM_yO_{12}$ (where M is Nb, Ta, or Zr), $Li_xMP_yS_z$ (where M is Ge or Sn), $Li_wAl_xM_{—y}(PO_4)_3$ (where M is Ge or Ti), $Li_xTi_yM_z(PO_4)_3$ (where M is Cr, Ga, Fe, Sc, In, Lu, Y or La) or $Na_xZr_2Si_yPO_{12}$, where in all cases, x, y and z represent stoichiometric coefficients.

11. The method of claim 8, wherein the solid-polymer-electrolyte is composed of one or more of the following polymers: polyethylene oxide (PEO), poly vinyl alcohol (PVA), poly methyl methacrylate (PMMA), poly dimethyl siloxane (PDMS), poly vinyl pyrollidone (PVP).

12. The method of claim 5, wherein the electrode material is composed of an active material.

13. The method of claim 1, wherein the conveyance apparatus comprises a series of rollers or a track for transferring in (b) and (e) the solid-state electrolyte or the solid-state-electrolyte-electrode composite matrix to at least one of the first reaction chamber or the second reaction chamber.

14. The method of claim 1, wherein the solid-state electrolyte or the solid-state-electrolyte-electrode composite matrix of (c) and (f) are exposed to the first and second liquid solutions by submerging, spraying, slot die coating, bath coating, or gravure roller coating.

15. The method of claim 1, further comprising:
    passing a first residual solution comprising the first solvent and unreacted first reagent to a first filtration step to separate unreacted first reagent from the first solvent; and
    passing a second residual solution comprising the second solvent and unreacted second reagent to a second filtration step to separate the unreacted second reagent from the second solvent.

16. The method of claim 1, further comprising:
    recycling recovered unreacted first or second reagent back to the first or second liquid solutions, respectively; and
    recycling recovered first or second solvent back to the first or second rinsing solutions, respectively.

17. The method of claim 15, wherein the first and second filtration steps are carried out using membrane separation, chemical precipitation, ion-exchange, electrochemical removal, physical adsorption, flow filtration chromatography, or any combination of these.

18. The method of claim 1, wherein the first liquid solution and the second liquid solution comprise more than one reagent.

19. The method of claim 1, wherein (a)-(g) are repeated to yield consecutive growth of multiple stacked monolayers, such that the thin film comprises one or more artificial SEI layers having an overall thickness between 0.5 nm and 100 µm.

20. The method of claim 1 wherein the compound generated is selected from one of the following groups:

(a) binary oxides of type $A_xO_y$, where A is an alkali metal, alkali-earth metal, transition metal, semimetal or metalloid and x and y are stoichiometric coefficients;

(b) ternary oxides of type $A_xB_yO_z$, where A and B are any combination of alkali metal, alkali-earth metal, transition metal, semimetal or metalloid and x, y and z are stoichiometric coefficients;

(c) quaternary oxides of type $A_wB_xC_yO_z$, where A, B and C are any combination of alkali metal, alkali-earth metal, transition metal, semimetal or metalloid and w, x, y and z stoichiometric coefficients;

(d) binary halides of type $A_xB_y$, where A is an alkali metal, alkali-earth metal, transition metal, semimetal or metalloid, B is a halogen and x and y are stoichiometric coefficients;

(e) ternary halides of type $A_xB_yC_z$, where A and B are any combination of alkali metal, alkali-earth metal, transition metal, semimetal or metalloid, C is a halogen and x, y and z are stoichiometric coefficients;

(f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;

(g) binary nitrides of type $A_xN_y$, where A is an alkali metal, alkali-earth metal, transition metal, semimetal or metalloid and x and y are stoichiometric coefficients;

(h) ternary nitrides of type $A_xB_yN_z$, where A and B are any combination of alkali metal, alkali-earth metal, transition metal, semimetal or metalloid and x, y and z are stoichiometric coefficients;

(i) quaternary nitrides of type $A_wB_xC_yN_z$, where A, B and C are any combination of alkali metal, alkali-earth metal, transition metal, semimetal or metalloid and w, x, y and z are stoichiometric coefficients;

(j) binary chalcogenides of type $A_xB_y$, where A is an alkali metal, alkali-earth metal, transition metal, semimetal or metalloid, B is a chalcogen and x and y are stoichiometric coefficients;

(k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;

(l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;

(m) binary carbides of type $A_xC_y$, where A is an alkali metal, alkali-earth metal, transition metal, semimetal or metalloid and x and y are stoichiometric coefficients;

(n) binary oxyhalides of type $A_xB_yO_z$, where A is an alkali metal, alkali-earth metal, transition metal, semimetal or metalloid, B is a halogen and x, y and z are stoichiometric coefficients;

(o) binary arsenides of type $A_xAs_y$, where A is an alkali metal, alkali-earth metal, transition metal, semimetal or metalloid and x and y are stoichiometric coefficients;

(p) ternary arsenides of type $A_xB_yAs_z$, where A and B are any combination of alkali metal, alkali-earth metal, transition metal, semimetal or metalloid and x, y and z are stoichiometric coefficients;

(q) quaternary arsenides of type $A_wB_xC_yAs_z$, where A, B and C are any combination of alkali metal, alkali-earth metal, transition metal, semimetal or metalloid and w, x, y and z are stoichiometric coefficients;

(r) binary phosphates of type $A_x(PO_4)_y$, where A is an alkali metal, alkali-earth metal, transition metal, semimetal or metalloid and x and y are stoichiometric coefficients;

(s) ternary phosphates of type $A_xB_y(PO_4)_z$, where A and B are any combination of alkali metal, alkali-earth metal, transition metal, semimetal or metalloid and x, y and z are stoichiometric coefficients; and (t) quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

21. The method of claim 19, wherein the thin film comprising the artificial SEI generated from the monolayer or the stacked monolayers is composed of at least one or more metalcone polymers.

22. The method of claim 21, wherein the one or more metalcone polymers are generated by a reaction between the first reagent comprising a metalorganic and the second reagent comprising an organic molecule.

23. The method of claim 22, wherein the metalorganic comprises an organic moiety and a metal comprising at least one of Al, Zn, Si, Ti, Zr, Hf, Mn, or V, and the organic molecule comprises at least one of ethylene glycol, glycerol, erythritol, xylitol, sorbitol, mannitol, butanediol, pentanediol, hydroquinone, hexanediol, lactic acid, triethanolamine, p-phenylenediamine, glycidol, caprolactone, fumaric acid, aminophenol, or diamino diphenyl ether.

24. The method of claim 19, wherein the thin film is composed of at least one or more polymers comprising a polyamide, polyimide, polyurea, polyazomethine, a fluoroelastomer, or any combination of these.

25. The method of claim 1, wherein the first and second reaction chambers are in the form of a tank, tray, or bath.

26. The method of claim 1, wherein the first and second reaction chambers include a sensor for determining an amount of the first or second liquid solution that is in the respective reaction chamber.

27. The method of claim 26, wherein the first and second reaction chambers comprise a valve for regulating an amount of the first or second liquid solution in their respective reaction chambers, said valve controlled by the sensor in each reaction chamber.

* * * * *